United States Patent
Abdelghaffar et al.

(10) Patent No.: US 12,470,358 B2
(45) Date of Patent: Nov. 11, 2025

(54) DOWNLINK PRE-EMPTION AND UPLINK CANCELLATION FOR FULL-DUPLEX SYSTEMS

(71) Applicant: QUALCOMM Incorporated, San Diego, CA (US)

(72) Inventors: Muhammad Sayed Khairy Abdelghaffar, San Jose, CA (US); Qian Zhang, Basking Ridge, NJ (US); Yan Zhou, San Diego, CA (US); Tao Luo, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 657 days.

(21) Appl. No.: 17/879,655

(22) Filed: Aug. 2, 2022

(65) Prior Publication Data
US 2024/0048349 A1  Feb. 8, 2024

(51) Int. Cl.
*H04L 5/14* (2006.01)
*H04L 5/00* (2006.01)

(52) U.S. Cl.
CPC ............ *H04L 5/14* (2013.01); *H04L 5/0064* (2013.01); *H04L 5/0082* (2013.01); *H04L 5/0091* (2013.01)

(58) Field of Classification Search
CPC ... H04L 1/1829; H04L 5/0053; H04L 5/0064; H04L 5/0082; H04L 5/0091; H04L 5/0094; H04L 5/14; H04L 5/1461; H04W 72/23; H04W 72/541
See application file for complete search history.

(56) References Cited

U.S. PATENT DOCUMENTS

| | | | |
|---|---|---|---|
| 2020/0236661 A1* | 7/2020 | Hassan Hussein ... | H04L 5/0044 |
| 2023/0133415 A1* | 5/2023 | Mu ........................ | H04W 72/00 370/329 |

(Continued)

FOREIGN PATENT DOCUMENTS

WO   WO-2021158480 A1   8/2021

OTHER PUBLICATIONS

International Search Report and Written Opinion—PCT/US2023/071064—ISA/EPO—Dec. 7, 2023.

*Primary Examiner* — Awet Haile
(74) *Attorney, Agent, or Firm* — Holland & Hart LLP

(57) ABSTRACT

Methods, systems, and devices for wireless communication are described. A user equipment (UE) may receive an indication of a sub-band full-duplex (SBFD) configuration of a cell serving the UE. The SBFD configuration may indicate a first set of resources for downlink communications and a second set of resources for uplink communications. The first set of resources and the second set of resources may include non-overlapping frequency resources in a same time interval. The UE may receive a control message that indicates a pre-emption of the first set of resources or a cancellation of the second set of resources. Accordingly, the UE may determine that downlink transmissions in at least a portion of the first set of resources are pre-empted or that uplink transmissions in at least a portion of the second set of resources are cancelled based on the control message and the SBFD configuration of the cell.

22 Claims, 17 Drawing Sheets

(56) References Cited

U.S. PATENT DOCUMENTS

| | | | |
|---|---|---|---|
| 2023/0143578 A1* | 5/2023 | Lin | H04L 5/0094 |
| | | | 370/329 |
| 2023/0254075 A1* | 8/2023 | Cozzo | H04L 5/001 |
| 2024/0089960 A1* | 3/2024 | Hao | H04W 72/0446 |
| 2025/0106826 A1* | 3/2025 | Dey | H04L 5/0048 |

* cited by examiner

DOWNLINK PRE-EMPTION AND UPLINK CANCELLATION FOR FULL-DUPLEX SYSTEMS

FIELD OF TECHNOLOGY

The following relates to wireless communication, including downlink pre-emption and uplink cancellation for full-duplex systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support downlink pre-emption and uplink cancellation for full-duplex systems. For example, the described techniques provide for reducing cross-link interference (CLI) between network entities with full-duplex capabilities. In accordance with aspects of the present disclosure, a user equipment (UE) may receive an indication of a sub-band full-duplex (SBFD) configuration of a cell serving the UE. The SBFD configuration may indicate a first set of resources for downlink communications and a second set of resources for uplink communications. The first set of resources and the second set of resources may include non-overlapping frequency resources in a same time interval. The UE may receive a control message that indicates a pre-emption of the first set of resources or a cancellation of the second set of resources. Accordingly, the UE may determine that downlink transmissions in at least a portion of the first set of resources are pre-empted or that uplink transmissions in at least a portion of the second set of resources are cancelled based on the control message and the SBFD configuration of the cell.

A method for wireless communication at a UE is described. The method may include receiving an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The method may further include receiving a control message that indicates a pre-emption of the first set of resources or a cancellation of the second set of resources. The method may further include determining that downlink transmissions in at least a portion of the first set of resources are pre-empted or that uplink transmissions in at least a portion of the second set of resources are cancelled based on the control message and the SBFD configuration of the cell.

An apparatus for wireless communication at a UE is described. The apparatus may include a processor, memory coupled with the processor, and instructions stored in the memory. The instructions may be executable by the processor to cause the apparatus to receive an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The instructions may be further executable by the processor to cause the apparatus to receive a control message that indicates a pre-emption of the first set of resources or a cancellation of the second set of resources. The instructions may be further executable by the processor to cause the apparatus to determine that downlink transmissions in at least a portion of the first set of resources are pre-empted or that uplink transmissions in at least a portion of the second set of resources are cancelled based on the control message and the SBFD configuration of the cell.

Another apparatus for wireless communication at a UE is described. The apparatus may include means for receiving an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The apparatus may further include means for receiving a control message that indicates a pre-emption of the first set of resources or a cancellation of the second set of resources. The apparatus may further include means for determining that downlink transmissions in at least a portion of the first set of resources are pre-empted or that uplink transmissions in at least a portion of the second set of resources are cancelled based on the control message and the SBFD configuration of the cell.

A non-transitory computer-readable medium storing code for wireless communication at a UE is described. The code may include instructions executable by a processor to receive an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The instructions may be further executable by the processor to receive a control message that indicates a pre-emption of the first set of resources or a cancellation of the second set of resources. The instructions may be further executable by the processor to determine that downlink transmissions in at least a portion of the first set of resources are pre-empted or that uplink transmissions in at least a portion of the second set of resources are cancelled based on the control message and the SBFD configuration of the cell.

In some examples of the methods, apparatuses, and non-transitory computer-readable media described herein, the determining may include operations, features, means, or instructions for determining that the control message is applicable to physical uplink control channel (PUCCH) transmissions and physical random access channel (PRACH) transmissions based on the SBFD configuration of the cell and a format of the control message, where the SBFD configuration indicates that SBFD communications are enabled for the cell.

In some examples of the methods, apparatuses, and non-transitory computer-readable media described herein, the determining may include operations, features, means, or instructions for determining that the control message is applicable to all uplink transmissions and uplink priority levels based on the SBFD configuration of the cell and a format of the control message, where the SBFD configuration indicates that SBFD communications are enabled for the cell.

Some examples of the methods, apparatuses, and non-transitory computer-readable media described herein may further include operations, features, means, or instructions for transmitting an uplink message via the second set of resources based on an uplink cancellation priority parameter indicated by the SBFD configuration of the cell and a priority level of the uplink message, where a transmission power for the uplink message is based on the priority level of the uplink message.

In some examples of the methods, apparatuses, and non-transitory computer-readable media described herein, the determining may include operations, features, means, or instructions for determining that the control message is applicable to physical uplink shared channel (PUSCH) transmissions and sounding reference signal transmissions based on the SBFD configuration of the cell and a format of the control message, where the SBFD configuration indicates that SBFD communications are disabled for the cell.

Some examples of the methods, apparatuses, and non-transitory computer-readable media described herein may further include operations, features, means, or instructions for determining to suppress an uplink transmission based on an overlap between the second set of resources and frequency resources to be used for the uplink transmission.

Some examples of the methods, apparatuses, and non-transitory computer-readable media described herein may further include operations, features, means, or instructions for determining to puncture a first portion of an uplink transmission based on an overlap between the second set of resources and frequency resources to be used for the first portion of the uplink transmission.

Some examples of the methods, apparatuses, and non-transitory computer-readable media described herein may further include operations, features, means, or instructions for applying a rate matching scheme to a first portion of an uplink transmission based on an overlap between the second set of resources and frequency resources to be used for the first portion of the uplink transmission.

Some examples of the methods, apparatuses, and non-transitory computer-readable media described herein may further include operations, features, means, or instructions for determining that frequency resources to be used for a first portion of an uplink transmission overlap with the second set of resources, transmitting the first portion of the uplink transmission with a first power spectral density (PSD), and transmitting a remaining portion of the uplink transmission with a second PSD that is lower than the first PSD.

In some examples of the methods, apparatuses, and non-transitory computer-readable media described herein, the determining may include operations, features, means, or instructions for determining that the control message is applicable to all downlink transmissions and downlink priority levels based on the SBFD configuration of the cell and a format of the control message, where the SBFD configuration indicates that SBFD communications are enabled for the cell.

In some examples of the methods, apparatuses, and non-transitory computer-readable media described herein, the determining may include operations, features, means, or instructions for determining that one or more synchronization signal block (SSB) transmissions or physical broadcast channel (PBCH) transmissions are cancelled based on the SBFD configuration of the cell and a format of the control message, where the SBFD configuration indicates that SBFD communications are enabled for the cell.

In some examples of the methods, apparatuses, and non-transitory computer-readable media described herein, the determining may include operations, features, means, or instructions for determining that the control message is applicable to SSB transmissions and PBCH transmissions based on a format of the control message and a SBFD configuration of a second cell that is different from the cell serving the UE, where the SBFD configuration of the second cell indicates that SBFD communications are enabled for the second cell.

In some examples of the methods, apparatuses, and non-transitory computer-readable media described herein, receiving the control message may include operations, features, means, or instructions for receiving UE-specific signaling or group common signaling that indicates a muting pattern for one or both of the first set of resources or the second set of resources.

In some examples of the methods, apparatuses, and non-transitory computer-readable media described herein, the UE-specific signaling or the group common signaling includes downlink control information (DCI) or a medium access control (MAC)-control element (CE).

In some examples of the methods, apparatuses, and non-transitory computer-readable media described herein, the determining may include operations, features, means, or instructions for determining that downlink transmissions are not expected in one or more symbols of the first set of resources based on a downlink radio resource control (RRC) configuration of the one or more symbols.

In some examples of the methods, apparatuses, and non-transitory computer-readable media described herein, the determining may include operations, features, means, or instructions for determining that uplink transmissions in one or more symbols of the second set of resources are cancelled based on an uplink RRC configuration of the one or more symbols.

In some examples of the methods, apparatuses, and non-transitory computer-readable media described herein, the determining may include operations, features, means, or instructions for determining that downlink transmissions are not expected in a downlink sub-band or uplink sub-band based on a sub-band blanking indication in the control message.

A method for wireless communication at a network entity is described. The method may include transmitting an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The method may further include transmitting a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

An apparatus for wireless communication at a network entity is described. The apparatus may include a processor, memory coupled with the processor, and instructions stored in the memory. The instructions may be executable by the processor to cause the apparatus to transmit an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The instructions may be further executable by the processor to cause the apparatus to transmit a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

Another apparatus for wireless communication at a network entity is described. The apparatus may include means for transmitting an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The apparatus may further include means for transmitting a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

A non-transitory computer-readable medium storing code for wireless communication at a network entity is described. The code may include instructions executable by a processor to transmit an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The instructions may be further executable by the processor to transmit a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

In some examples of the methods, apparatuses, and non-transitory computer-readable media described herein, transmitting the control message may include operations, features, means, or instructions for transmitting UE-specific signaling or group common signaling that indicates a muting pattern for one or both of the first set of resources or the second set of resources.

In some examples of the methods, apparatuses, and non-transitory computer-readable media described herein, the muting pattern indicated by the UE-specific signaling or the group common signaling may be applicable to the cell serving the UE.

In some examples of the methods, apparatuses, and non-transitory computer-readable media described herein, the muting pattern may be applicable to one or both of the first set of resources or the second set of resources when SBFD communications are enabled for the cell.

In some examples of the methods, apparatuses, and non-transitory computer-readable media described herein, the UE-specific signaling or the group common signaling includes DCI or a MAC-CE.

DETAILED DESCRIPTION

Figure 1:
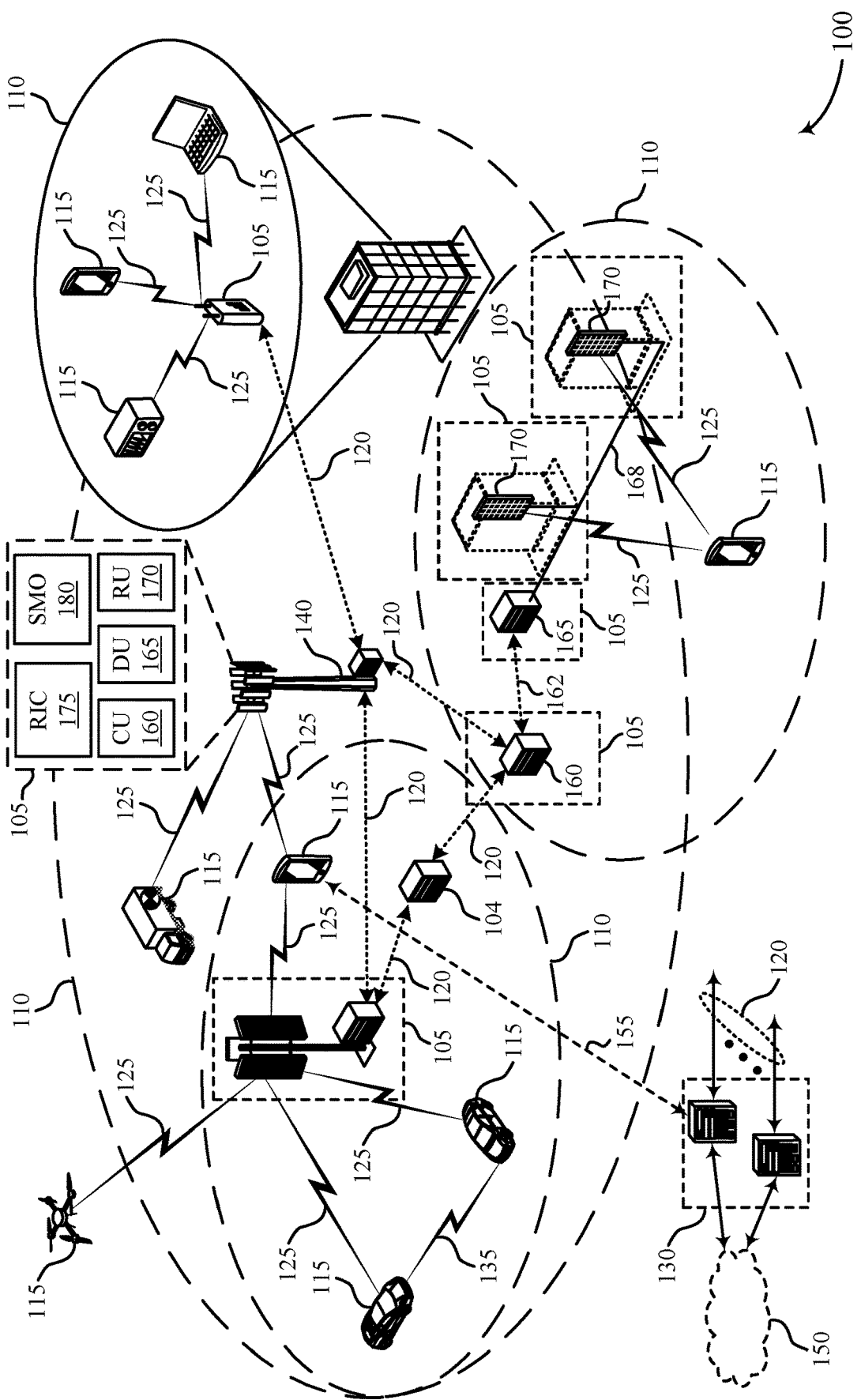
FIGS. 1 and 2 illustrate examples of wireless communications systems that support downlink pre-emption and uplink cancellation for full-duplex systems in accordance with one or more aspects of the present disclosure.

Some communication devices, such as a user equipment (UE) or a network entity, may be capable of performing simultaneous transmission and reception in accordance with a full-duplex communication scheme. For example, in a sub-band full-duplex (SBFD) communication scheme, a communication device may use different (non-overlapping) portions of a radio frequency (RF) spectrum band for uplink and downlink operations. In a single-frequency full-duplex (SFFD) communication scheme, a communication device may use code division multiplexing (CDM) or space division multiplexing (SDM) to perform concurrent uplink and downlink operations on resources that overlap in time and frequency. In other full-duplex communication schemes, a communication device may perform simultaneous uplink and downlink operations on resources that partially overlap in time or frequency.

In some cases, performing simultaneous transmission and reception at a communication device may result in self-interference at the communication device or cross-link interference (CLI) at other communication devices. For example, a downlink transmission from a first network entity may cause CLI at a second network entity that is receiving an uplink transmission from a UE. To cancel or mute transmissions that could potentially cause CLI, a network entity may transmit downlink control information (DCI) that includes one or more cancellation indications (for uplink communications) or pre-emption indications (for downlink communications). However, these indications may not be applicable to some channels and transmission types. As a result, conventional mechanisms be unable to mitigate CLI in full-duplex systems.

Aspects of the present disclosure improve the flexibility of cancellation indications and pre-emption indications by configuring different muting patterns for different communication schemes. For example, a cancellation indication may be applicable to all uplink transmission types and channels if SBFD communications are configured for a serving cell of a UE. Otherwise, the cancellation indication may be applicable to a subset of uplink channels and transmission types. Likewise, a pre-emption indication may be applicable to all downlink transmission types and channels if SBFD communications are enabled for the serving cell. If SBFD communications are disabled (or not configured), the pre-emption indication may be applicable to a subset of downlink channels and priority levels.

In some examples, a UE may determine that a cancellation indication is applicable to physical uplink control channel (PUCCH) transmissions, physical uplink shared channel (PUSCH) transmissions, physical random access channel (PRACH) transmissions, sounding reference signal (SRS) transmissions, or a combination thereof based on a SBFD configuration of a cell serving the UE (e.g., if SBFD communications are enabled for the cell). Similarly, the UE may determine that a pre-emption indication is applicable to synchronization signal block (SSB) transmissions and physical broadcast channel (PBCH) transmissions based on the SBFD configuration of the cell. In some examples, a network entity may indicate a muting pattern via UE-specific signaling or group common signaling. This muting pattern may indicate time and frequency resources in which uplink transmissions are cancelled or downlink transmissions are not expected.

Aspects of the present disclosure may be implemented to realize one or more of the following advantages. The described techniques may reduce CLI caused by full-duplex communications at one or more network entities. For example, a first network entity with SBFD capabilities can use one or more pre-emption indications (signaled via DCI) or muting patterns (indicated via UE-specific signaling or group-common signaling) to pre-empt one or more SSB or PBCH transmissions that overlap with uplink transmissions to a second network entity, thereby reducing the likelihood of the SSB or PBCH transmissions (from the first network entity) causing CLI at the second network entity.

Aspects of the disclosure are initially described in the context of wireless communications systems, resource diagrams, and process flows. Aspects of the disclosure are further illustrated by and described with reference to apparatus diagrams, system diagrams, and flowcharts that relate to downlink pre-emption and uplink cancellation for full-duplex systems.

FIG. 1 illustrates an example of a wireless communications system 100 that supports downlink pre-emption and uplink cancellation for full-duplex systems in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled)

by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support downlink pre-emption and uplink cancellation for full-duplex systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$, may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support full-duplex communications (e.g., simultaneous transmission and reception). Some full-duplex communication schemes may include TDD bands without duplex enhancements for FDD bands. Other full-duplex communication schemes may support full-duplex operations at a network entity 105 and half-duplex operations at a UE 115. Other full-duplex communication schemes may support SBFD deployments, where concurrent downlink and uplink operations are performed using non-overlapping frequency resources. Some wireless communications systems may support techniques for mitigating inter-gNB CLI and inter-UE CLI in full-duplex deployments. These systems may have RF requirements (and various other regulatory aspects) for self-interference, inter-sub-band CLI, inter-operator CLI, and FDD-like operations in TDD bands.

Some SBFD deployments that support non-overlapping full-duplex operations and dynamic (flexible) TDD may have regulations and RF requirements for adjacent-channel co-existence with other RATs and communication schemes. These requirements may relate to RF antennas, algorithms, antenna isolation, transmission intermodulation suppression (at a receiving device), filtering, and digital interference suppression, among other examples. These regulations may affect full-duplex deployments in TDD unpaired spectrums.

The wireless communications system 100 may support various DCI formats, such as DCI format 2_1 and DCI format 2_4. DCI format 2_1 may be used to notify one or more UEs 115 of physical resource blocks (PRBs) and OFDM symbols in which the UEs 115 can assume that no transmissions are intended for the UEs 115. One or more pre-emption indications can be transmitted by means of DCI format 2_1 with a cyclic redundancy check (CRC) scrambled by an interruption radio network temporary identifier (INT-RNTI). The size of DCI format 2_t is configurable by higher layers up to 126 bits, where each pre-emption indication is 14 bits. If a UE 115 detects a DCI format 2_1 for a serving cell from a configured set of serving cells, the UE 115 may assume that no transmission to the UE 115 is present in the PRBs and symbols indicated by the DCI format 2_1 (from a set of PRBs and symbols of a last monitoring period). However, the pre-emption indication transmitted by means of DCI format 2_1 may not be applicable to SSB or PBCH transmissions.

DCI format 2_4 may be used to notify one or more UEs 115 of PRBs and OFDM symbols in which uplink transmissions from the UEs 115 are cancelled. One or more cancellation indications can be transmitted by means of DCI format 2_4 with a CRC scrambled by a cancellation indication radio network temporary identifier (CI-RNTI). The size of DCI format 2_4 is configurable by a higher layer parameter dci PayloadSizeforCI up to 126 bits. The number of bits for each cancellation indication is configurable by a higher layer parameter ci-PayloadSize. DCI format 2_4 may include up to one cancellation indication per uplink carrier for a given UE 115. A cancellation indication transmitted by means of DCI format 2_4 is applicable to PUSCH transmissions and SRS transmissions on a serving cell of a UE 115.

In accordance with the techniques described herein, a UE 115 may receive an indication of a SBFD configuration for a serving cell of the UE 115. The SBFD configuration may indicate a first set of resources for downlink communications and a second set of resources for uplink communications. The first set of resources and the second set of resources may include non-overlapping frequency resources in a same time interval. The UE 115 may receive a control message that indicates a pre-emption of the first set of resources or a cancellation of the second set of resources. Accordingly, the UE 115 may determine that downlink transmissions in at least a portion of the first set of resources are pre-empted or that uplink transmissions in at least a portion of the second set of resources are cancelled based on the control message and the SBFD configuration of the cell.

Aspects of the wireless communications system 100 may be implemented to realize one or more of the following advantages. The techniques described with reference to FIG. 1 may reduce CLI caused by full-duplex communications at one or more network entities 105. For example, a first network entity 105 with SBFD capabilities can use one or more cancellation indications (transmitted by means of DCI format 2_4) to cancel one or more PUCCH or PRACH transmissions that overlap with downlink transmissions from a second network entity, thereby reducing the likelihood of the downlink transmissions (from the second network entity) interfering with reception of the PUCCH or PRACH transmissions at the first network entity.

Figure 2:
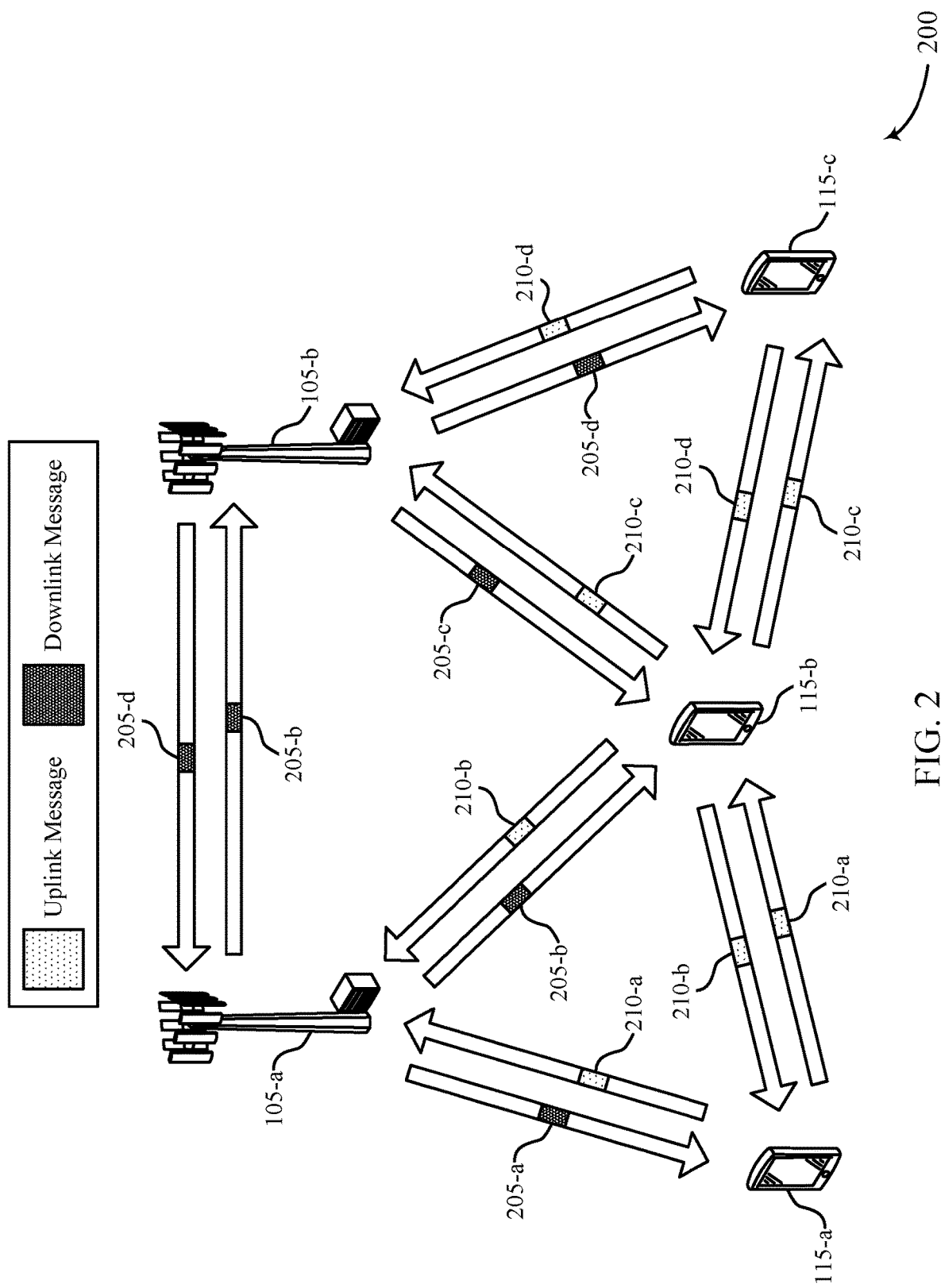

FIG. 2 illustrates an example of a wireless communications system 200 that supports downlink pre-emption and uplink cancellation for full-duplex systems in accordance with one or more aspects of the present disclosure. The wireless communications system 200 may implement or be implemented by aspects of the wireless communications system 100. For example, the wireless communications system 200 may include a network entity 105-a, a network entity 105-b, a UE 115-a, a UE 115-b, and a UE 115-c, which may be examples of corresponding devices described with reference to FIG. 1. In the wireless communications system 200, the network entities 105 may use pre-emption indications (transmitted by means of DCI format 2_t), cancellation indications (transmitted by means of DCI format 2_4), and muting patterns (transmitted by means of UE-specific signaling or group-common signaling) to mitigate CLI.

In the example of FIG. 2, one or more of the UEs 115 or the network entities 105 may support full-duplex communications. For example, the network entity 105-a may transmit a downlink message 205-a to the UE 115-a while simultaneously receiving an uplink message 210-b from the UE 115-b. Similarly, the network entity 105-b may receive an uplink message 210-d from the UE 115-c while concurrently transmitting a downlink message 205-c to the UE 115-b. In some cases, however, these full-duplex communications may cause self-interference or CLI. For example, transmitting an uplink message 210-a to the network entity 105-a while receiving the downlink message 205-a from the network entity 105-a may cause self-interference at the UE 115-a. Likewise, a downlink message 205-b from the network entity 105-a may interfere with reception of an uplink message 210-c (from the UE 115-b) at the network entity 105-b, and a downlink message 205-d from the network entity 105-b may interfere with reception of the uplink message 210-b (from the UE 115-b) at the network entity 105-a.

The wireless communications system 200 may support different DCI formats. However, some of these DCI formats (2_1 and 2_4) may be limited to full downlink and uplink muting scenarios. For example, DCI format 2_4 may only be applicable to PUSCH transmissions and SRS transmissions. That is, DCI format 2_4 may not be applicable to random access occasions and PUCCH transmissions. Likewise, DCI format 2_1 may not be applicable to SSB transmissions. Furthermore, DCI formats 2_1 and 2_4 are group common DCI formats that may have limited reliability in some cases. When the network entities 105 mute downlink transmissions (via one or more pre-emption indications), the UEs 115 may not expect any downlink transmissions at the indicated resources (including SSB transmissions). Likewise, when the network entities 105 mute uplink transmissions from the UEs 115 (via one or more cancellation indications), the UEs 115 may suppress all uplink transmissions on the indicated resources.

The techniques and operations described with reference to FIG. 2 may enhance downlink pre-emption indications and uplink cancellation indications to enable comprehensive downlink and uplink muting for downlink and uplink signals and channels with different priorities. The described techniques may also support using UE-specific L1 signaling to indicate muting patterns and improve the reliability of detection (in comparison to group-common DCI). If both uplink cancellation indications and intra-UE priority indicators are configured for one or more of the UEs 115, an RRC parameter can be used to configure different behaviors for different scenarios. If this parameter is provided to the UEs 115, uplink cancellation indications may be applicable to uplink transmissions that are indicated or configured with a low priority level. Otherwise, uplink cancellation indications may be applicable to all uplink transmissions (regardless of priority level).

Aspects of the wireless communications system 200 may be implemented to realize one or more of the following advantages. The techniques described with reference to FIG. 2 may reduce CLI caused by full-duplex communications at the network entities 105. For example, the network entity 105-a (e.g., a gNB with SBFD capabilities) can use one or more pre-emption indications (transmitted by means of DCI format 2_1) to pre-empt one or more SSB or PBCH transmissions from the network entity 105-a that overlap with uplink transmissions to the network entity 105-b, thereby reducing the likelihood of the SSB or PBCH transmissions (from the network entity 105-a) interfering with reception of the uplink transmissions at the network entity 105-b.

Figure 3:
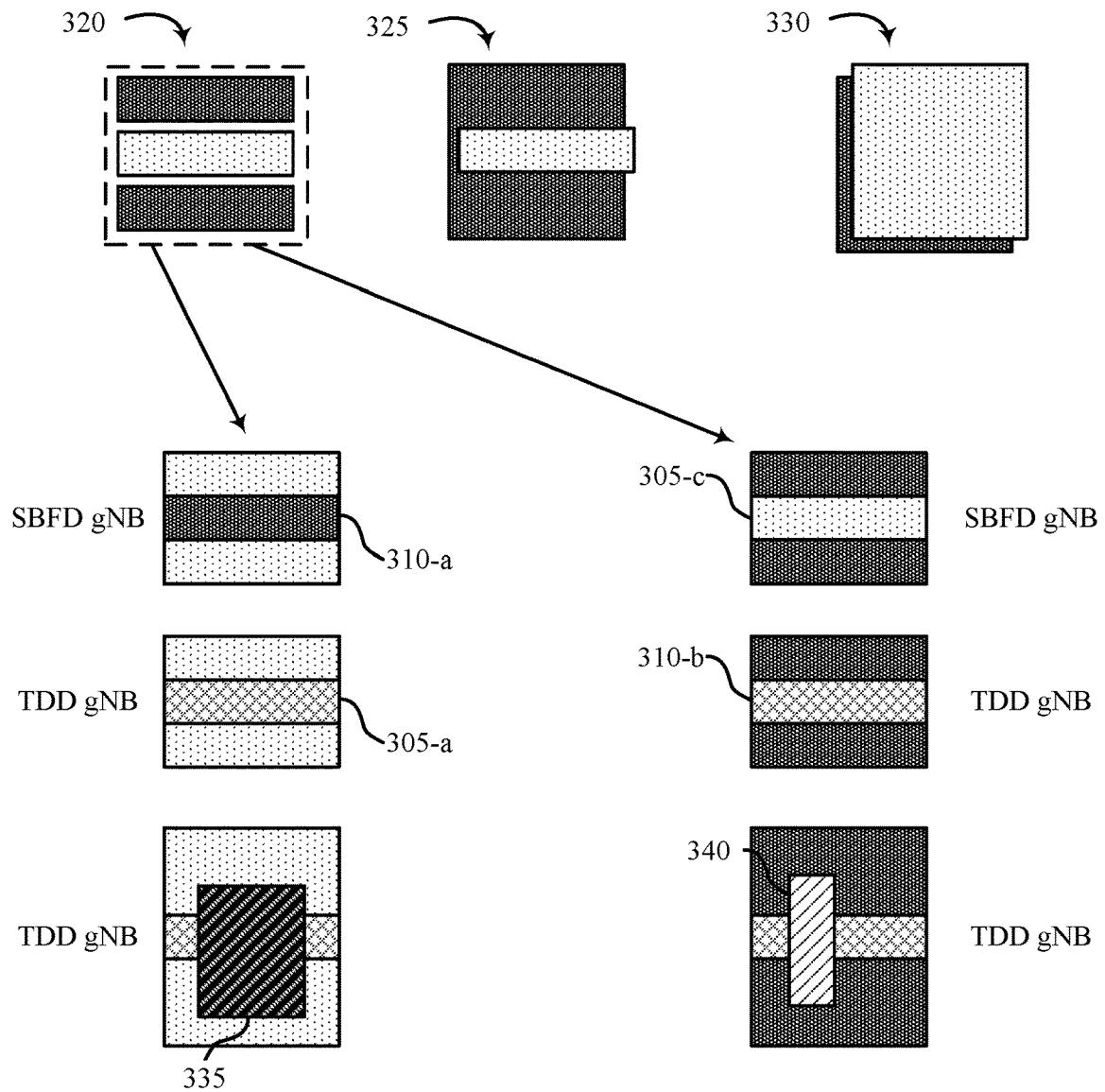
FIGS. 3 and 4 illustrate examples of resource diagrams that support downlink pre-emption and uplink cancellation for full-duplex systems in accordance with one or more aspects of the present disclosure.

FIG. 3 illustrates an example of a resource diagram 300 that supports downlink pre-emption and uplink cancellation for full-duplex systems in accordance with one or more aspects of the present disclosure. The resource diagram 300 may implement or be implemented by aspects of the wireless communications system 100 or the wireless communications system 200. For example, the resource diagram 300 may be implemented by a UE or a network entity, which may be examples of corresponding devices described with reference to FIGS. 1 and 2. The resource diagram 300 illustrates various full-duplex communication schemes and deployment scenarios.

The full-duplex communication scheme 320 may be an example of a SBFD deployment scenario with non-overlapping uplink and downlink sub-bands. The full-duplex communication scheme 325 may be an example of a full-duplex deployment scenario with partially overlapping uplink and downlink sub-bands. The full-duplex communication scheme 330 may be an example of a SFFD deployment scenario with fully overlapping uplink and downlink sub-bands. In some examples, the full-duplex communication scheme 320 may correspond to a deployment scenario with full-duplex gNBs and half-duplex UEs, while the full-duplex communication scheme 325 may correspond to a deployment scenario with full-duplex gNBs and UEs. The full-duplex communication scheme 330 may, in some examples, be applicable to deployment scenarios with half-duplex gNBs, half-duplex multiple transmission-reception points (mTRPs), UEs with SBFD capabilities, or any combination thereof.

In the example of FIG. 3, a first network entity with SBFD enabled (SBFD gNB) and a second network entity with TDD enabled (TDD gNB) may be configured with different uplink and downlink frequency sub-bands. For example, downlink resources 310-a of the SBFD gNB may overlap with uplink resources 305-a of the TDD gNB. To mitigate inter-gNB CLI that results from this overlap, the TDD gNB can mute the uplink resources 305-a, as illustrated in the resource diagram 300. Similarly, if downlink resources 310-b of the TDD gNB overlap with uplink resources 305-c of the SBFD gNB, the TDD gNB can mute the downlink resources 310-b to reduce the likelihood of downlink transmissions from the TDD gNB interfering with uplink reception at the SBFD gNB.

Aspects of the present disclosure support enhancements to DCI format 2_4. For example, a cancellation indication transmitted by means of DCI format 2_4 may be applicable to PUCCH transmissions and PRACH transmissions when SBFD is configured (for a serving cell of a UE). In some examples, the cancellation indication may be applicable to all uplink signals and channels (regardless of whether uplinkCancellationPriority is configured). In other examples, if uplinkCancellationPriority is configured, higher priority signals and channels can be transmitted with higher power to enable uplink reception at a victim gNB (equivalently referred to as a network entity) that is experiencing inter-gNB CLI. The cancellation indication may be applicable to RRC-configured uplink transmissions as well as dynamically scheduled uplink transmissions.

A cancellation indication transmitted by means of DCI format 2_4 may be applicable to PUSCH transmissions and SRS transmissions if SBFD communications are configured for a serving cell of a UE. Otherwise, the cancellation indication may be applicable to all uplink signals, channels, and priorities. In some examples, if an uplink transmission 335 partially overlaps with muted uplink frequency resources, a UE may fully drop (suppress, refrain from transmitting) the uplink transmission 335. In other examples, if the uplink transmission 335 is an SRS transmission, the UE may puncture the uplink transmission 335 at the cancelled resources. If the uplink transmission 335 is a PUSCH transmission, the UE may rate match the uplink transmission 335 around the cancelled resources. Additionally or alternatively, the UE may apply a transmission power boost to the uplink transmission 335 by increasing the power spectral density (PSD) of the frequency resources used for the uplink transmission 335. In some examples, this PSD boost may be selectively applied to frequency resources that overlap with the cancelled resources.

Aspects of the present disclosure also support enhancements to DCI format 2_1. Specifically, DCI format 2_1 can be used to mute or pre-empt all downlink signals and channels (including SSB transmissions) when SBFD is configured for a serving cell of a UE. For example, the TDD gNB may drop (mute, suppress) an SSB transmission 340 to mitigate inter-gNB CLI in an uplink sub-band of the SBFD gNB. If the UE detects DCI format 2_1 for the serving cell (from a configured set of serving cells), the UE may assume that no transmission to the UE is present in PRBs and OFDM symbols indicated by the DCI format 2_1 (from a set of PRBs and symbols of a last monitoring period). The indication by DCI format 2_1 may apply to SSB transmissions and PBCH transmissions when SBFD communications are configured for the serving cell or a neighboring cell.

The resource diagram 300 may also support techniques for reducing inter-gNB CLI by using UE-dedicated signaling (L1 or L2 signaling) to indicate a muting pattern that specifies time and frequency resources where uplink transmissions are cancelled or downlink transmissions are not expected. For each set of time and frequency resources indicated by the muting pattern, a bit may indicate whether uplink transmissions are cancelled or downlink transmissions are not expected. If an indicated symbol is designated as a downlink symbol (via RRC signaling), the UE may not expect to receive downlink transmissions in the indicated symbol. Likewise, if an indicated symbol is configured as an uplink symbol, the UE may cancel uplink transmissions in the indicated symbol. The muting pattern may be applicable to a serving cell of the UE.

When SBFD communications are enabled (configured) for the serving cell of the UE, the muting pattern (indicated by L1 or L2 signaling) can indicate sub-band blanking. When a downlink sub-band is blanked (muted), the UE may not expect to receive downlink transmissions in the downlink sub-band for the indicated time resources (OFDM symbols). In some examples, however, the UE may be dynamically scheduled to transmit an uplink message within the blanked downlink sub-band. In other words, the muting pattern may optionally convert the downlink sub-band to an uplink sub-band. When an uplink sub-band is blanked, the UE may cancel all uplink transmissions in the uplink sub-band for the indicated time resources. In some examples, the UE may be dynamically scheduled to receive a downlink transmission within the muted uplink sub-band (e.g., the muting pattern may optionally convert the uplink sub-band to a downlink sub-band).

Figure 4:
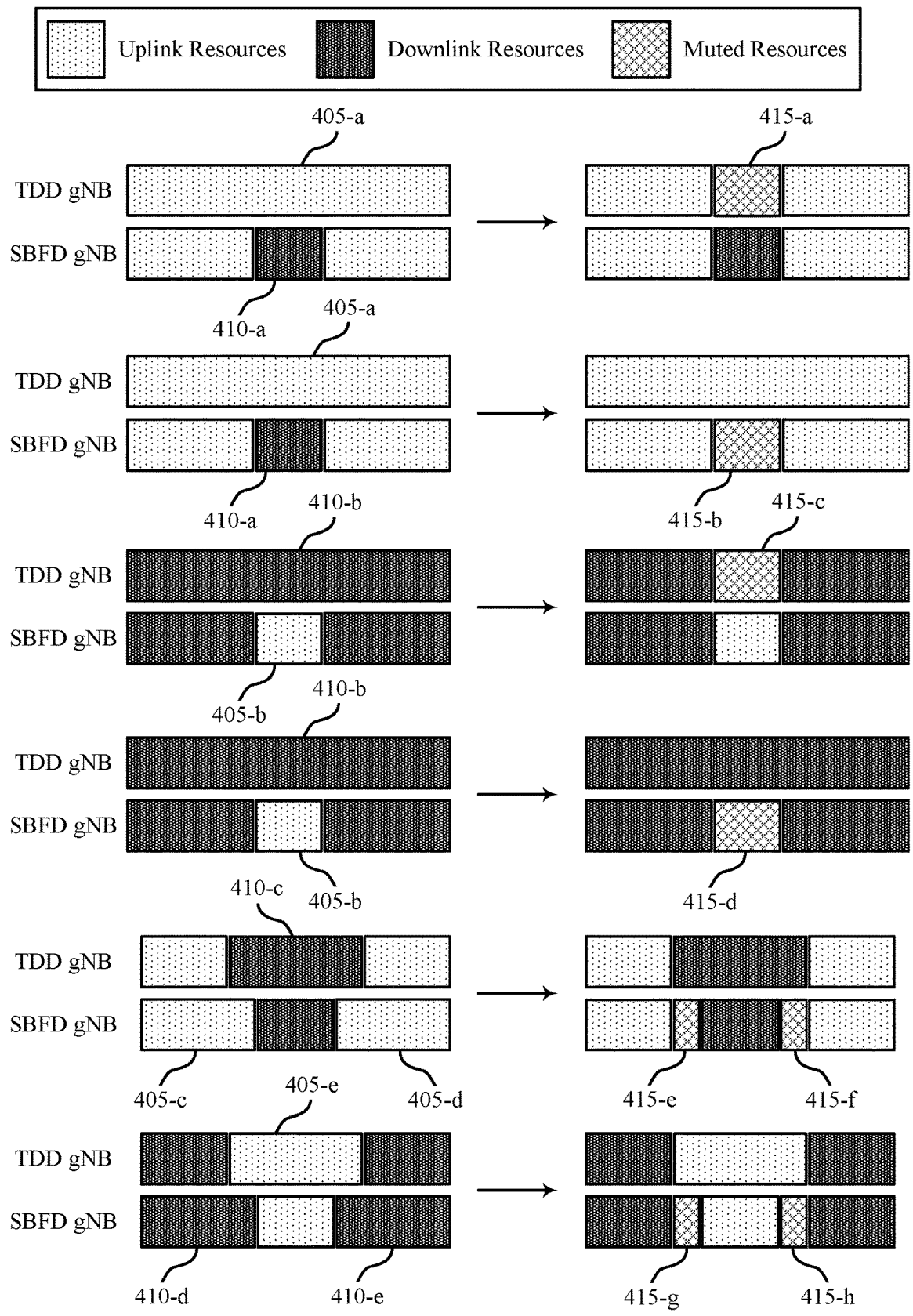

FIG. 4 illustrates an example of a resource diagram 400 that supports downlink pre-emption and uplink cancellation for full-duplex systems in accordance with one or more aspects of the present disclosure. The resource diagram 400 may implement or be implemented by aspects of the wireless communications system 100 or the wireless communications system 200. For example, the resource diagram 400 may be implemented by a UE or a network entity, which may be examples of corresponding devices described with reference to FIGS. 1 and 2. The resource diagram 400 illustrates various communication schemes that support coexistence between a first network entity with SBFD communications enabled (SBFD gNB) and a second network entity with TDD configured (TDD gNB).

In some examples, downlink transmissions from the SBFD gNB may cause inter-gNB CLI at the TDD gNB (and vice versa) if the SBFD gNB and the TDD gNB are configured with different uplink and downlink sub-bands. For example, downlink transmissions from the TDD gNB (the aggressor gNB) may interfere with uplink reception at the SBFD gNB (the victim gNB) if a downlink sub-band of the TDD gNB overlaps with an uplink sub-band of the SBFD gNB. To mitigate this inter-gNB CLI, the TDD gNB can mute downlink frequency resources that overlap with uplink sub-band frequency resources of the SBFD gNB. Likewise, if downlink transmissions from the SBFD gNB (the aggressor gNB) interfere with uplink reception at the TDD gNB (the victim gNB), the TDD gNB can mute uplink frequency resources that overlap with downlink sub-band frequency resources of the SBFD gNB.

As an example, if uplink resources 405-a of the TDD gNB partially overlap with downlink resources 410-a of the SBFD gNB, the TDD gNB may mute (cancel) uplink resources 415-a that overlap with the downlink resources 410-a. Alternatively, the SBFD gNB can mute (pre-empt) downlink resources 415-b that overlap with the uplink resources 405-a. Likewise, if downlink resources 410-b of the TDD gNB partially overlap with uplink resources 405-b of the SBFD gNB, the TDD gNB may mute (pre-empt) downlink resources 415-c that overlap with the uplink resources 405-b. Alternatively, the SBFD gNB can mute (cancel) uplink resources 415-d that overlap with the downlink resources 410-b.

If, for example, uplink resources 405-c and uplink resources 405-d of the SBFD gNB both partially overlap with downlink resources 410-c of the TDD gNB, the SBFD gNB can mute (cancel) uplink resources 415-e and uplink resources 415-f that overlap with the downlink resources 410-c of the TDD gNB. Similarly, if downlink resources 410-d and downlink resources 410-e of the SBFD gNB both partially overlap with uplink resources 405-e of the TDD gNB, the SBFD gNB can mute (pre-empt) downlink resources 415-g and downlink resources 415-h that overlap with the uplink resources 405-e of the TDD gNB.

Figure 5:
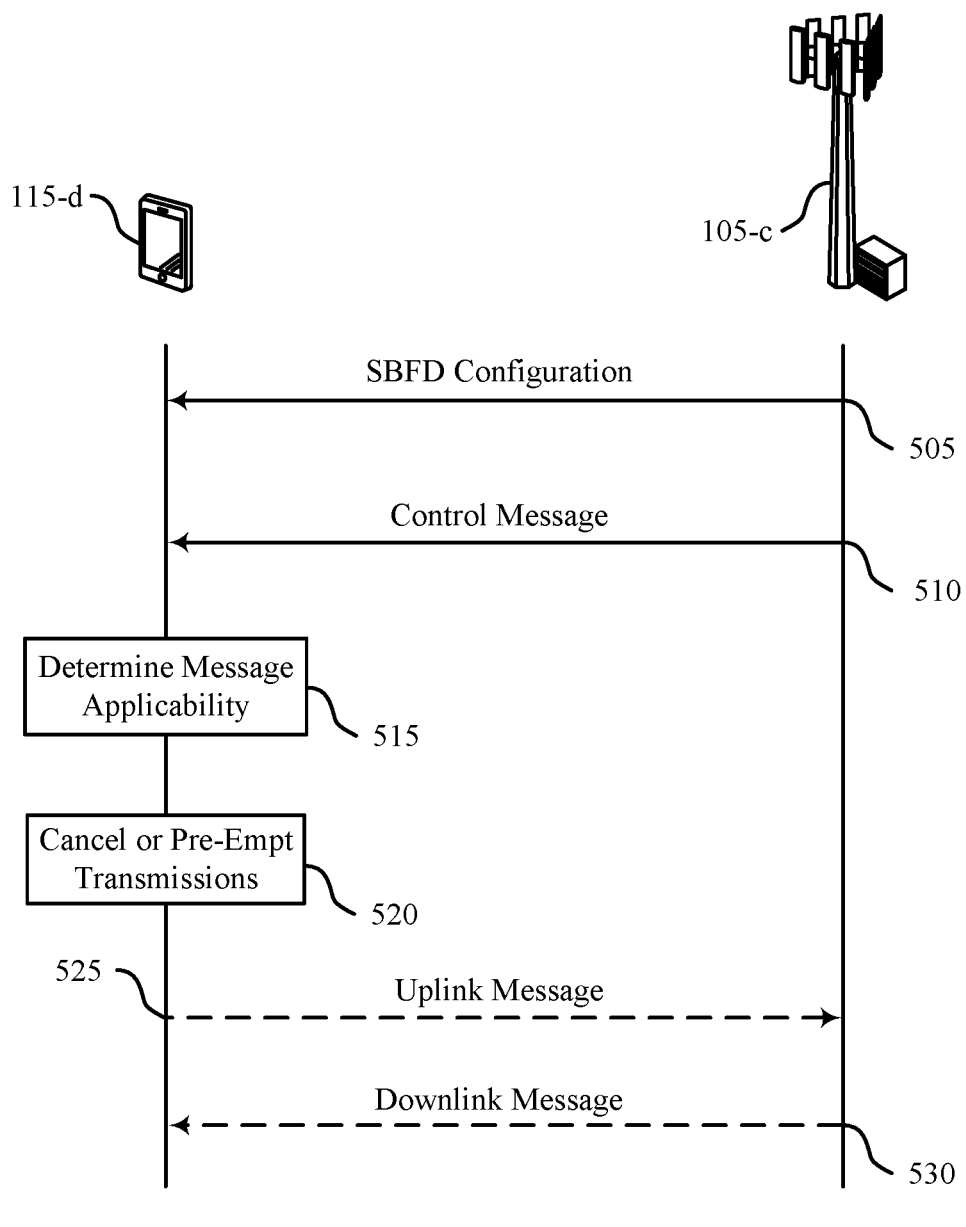
FIG. 5 illustrates an example of a process flow that supports downlink pre-emption and uplink cancellation for full-duplex systems in accordance with one or more aspects of the present disclosure.

FIG. 5 illustrates an example of a process flow 500 that supports downlink pre-emption and uplink cancellation for full-duplex systems in accordance with one or more aspects of the present disclosure. The process flow 500 may implement or be implemented by aspects of the wireless communications system 100 or the wireless communications system 200. For example, the process flow 500 may include a UE 115-d and a network entity 105-c, which may be examples of corresponding devices described with reference to FIGS. 1 and 2. In the following description of the process flow 500, operations between the UE 115-d and the network entity 105-c may be added, omitted, or performed in a different order (with respect to the exemplary order shown).

At 505, the UE 115-d may receive an indication of an SBFD configuration of a cell serving the UE 115-d (e.g., a cell of the network entity 105-c). The SBFD configuration may indicate a first set of resources for downlink communications and a second set of resources for uplink communications. The first set of resources and the second set of resources may include non-overlapping frequency resources in a same slot. At 510, the network entity 105-c may transmit a control message that indicates a pre-emption of the first set of resources or a cancellation of the second set of resources. The control message may include a MAC-CE, DCI (format 2_1 or 2_4), UE-specific signaling, group common signaling, or some combination thereof. In some examples, the control message may indicate a muting pattern for one or both of the first set of resources or the second set of resources.

At 515, the UE 115-d may determine that the control message is applicable to PUCCH transmissions, PRACH transmissions, SRS transmissions, PUSCH transmissions, or a combination thereof based on the SBFD configuration of the cell serving the UE 115-d and a format of the control message (DCI format 2_4). Additionally or alternatively, the UE 115-d may determine that the control message is applicable to SSB transmissions and PBCH transmissions based on the SBFD configuration of the cell serving the UE 115-d and a format of the control message (DCI format 2_1). If the SBFD configuration indicates that SBFD communications are enabled for the network entity 105-c, the control message may be applicable to all uplink transmission types, channels, and priority levels or all downlink transmission types, channels, and priority levels (depending on the format of the control message).

At 520, the UE 115-d may determine that downlink transmissions in at least a portion of the first set of resources are pre-empted or that uplink transmissions in at least a portion of the second set of resources are cancelled based on the control message and the SBFD configuration of the cell serving the UE 115-d. For example, the UE 115-d may determine to suppress, puncture, or rate match an uplink transmission that overlaps with the second set of resources. Additionally or alternatively, the UE 115-d may use a higher PSD for uplink transmissions that overlap (in frequency) with the second set of resources. In some examples, the UE 115-d may determine that downlink transmissions are not expected in a downlink sub-band based on a blanking indication in the control message. In other examples, the UE 115-d may determine that uplink transmissions are cancelled in an uplink sub-band based on a blanking indication in the control message.

In some examples, the UE 115-d may transmit an uplink message to the network entity 105-c at 525. For example, the UE 115-d may transmit an uplink message via the second set of resources based on an uplink cancellation priority parameter (uplinkCancellationPriority) indicated by the SBFD configuration of the cell and a priority level of the uplink message. In some examples, the UE 115-d may determine a transmit power for the uplink message based on the priority level of the uplink message. In some examples, the network entity 105-c may dynamically schedule the uplink message on resources that overlap with a muted (blanked) downlink sub-band. At 530, the network entity 105-c may transmit a dynamically scheduled downlink message on resources that overlap with a muted (blanked) uplink sub-band.

Aspects of the process flow 500 may be implemented to realize one or more of the following advantages. The techniques described with reference to FIG. 5 may reduce CLI caused by full-duplex communications at the network entity 105-c. For example, the network entity 105-c (e.g., a gNB with SBFD communications enabled) can use one or more cancellation indications (transmitted by means of DCI format 2_4) or muting patterns (transmitted by means of UE-specific signaling or group-common signaling) to cancel one or more PUSCH or SRS transmissions (from the UE 115-d) that overlap with downlink transmissions from a second network entity, thereby reducing the probability of the downlink transmissions causing CLI at the network entity 105-c.

Figure 6:
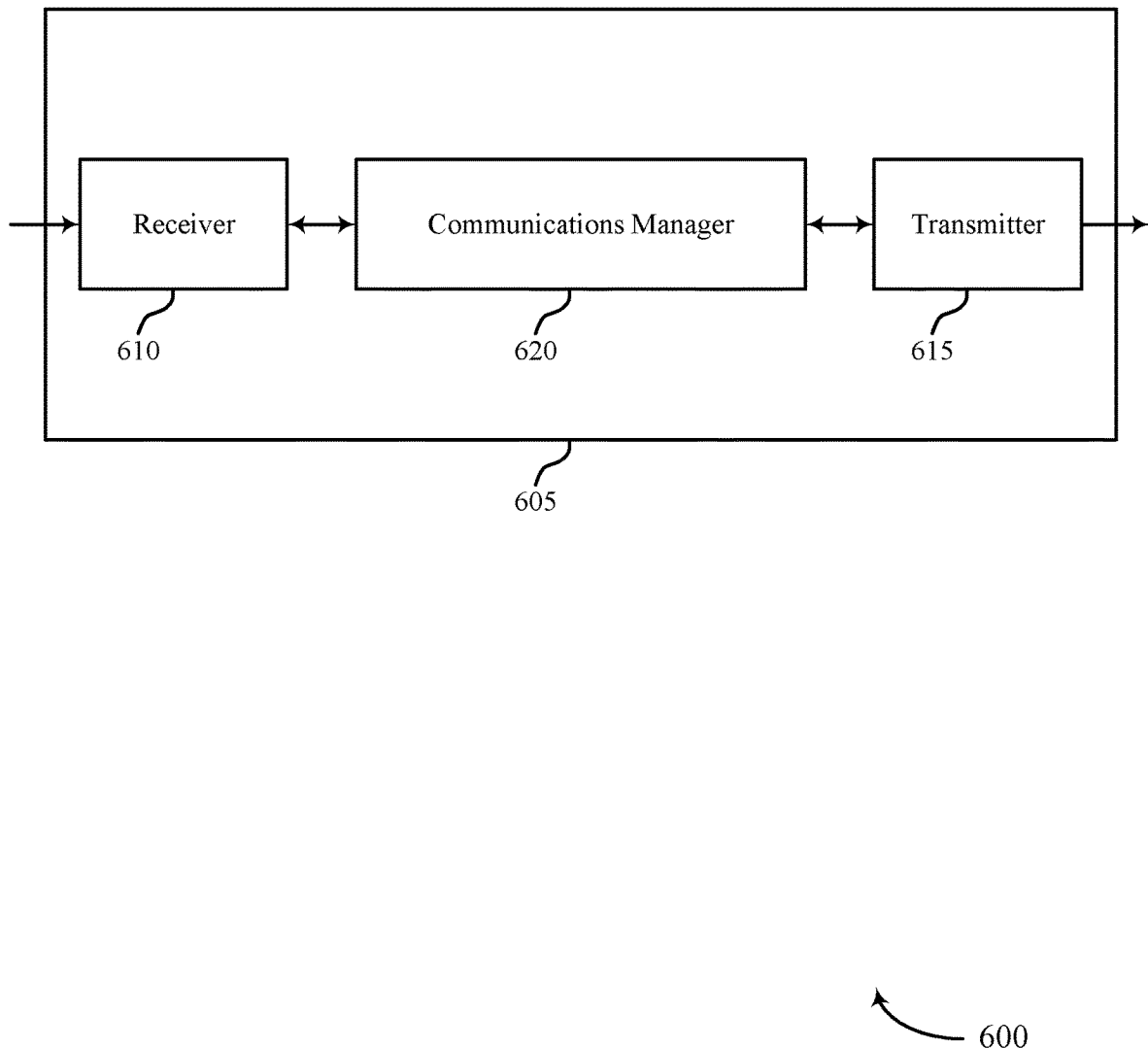
FIGS. 6 and 7 show block diagrams of devices that support downlink pre-emption and uplink cancellation for full-duplex systems in accordance with one or more aspects of the present disclosure.

FIG. 6 shows a block diagram 600 of a device 605 that supports downlink pre-emption and uplink cancellation for full-duplex systems in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to downlink pre-emption and uplink cancellation for full-duplex systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to downlink pre-emption and uplink cancellation for full-duplex systems). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of downlink pre-emption and uplink cancellation for full-duplex systems as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at the device 605 in accordance with examples disclosed herein. For example, the communications manager 620 may be configured as or otherwise support a means for receiving an indication of an SBFD configuration of a cell serving the device 605, the SBFD configuration indicating a first set of resources for downlink communications and a second set of resources for uplink communications, where the first set of resources and the second set of resources include non-overlapping frequency resources in a same time interval. The communications manager 620 may be configured as or otherwise support a means for receiving a control message that indicates a pre-emption of the first set of resources or a cancellation of the second set of resources. The communications manager 620 may be configured as or otherwise support a means for determining that downlink transmissions in at least a portion of the first set of resources are pre-empted or that uplink transmissions in at least a portion of the second set of resources are cancelled based on the control message and the SBFD configuration of the cell.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption by reducing the number of retransmissions performed by the device 605. For example, the techniques described herein may reduce CLI at a network entity communicating with the device 605, which may increase the likelihood of uplink messages from the device 605 being successfully received by the network entity. As such, the device 605 may retransmit the uplink messages fewer times, which may result in decreased power consumption at the device 605, among other benefits.

Figure 7:
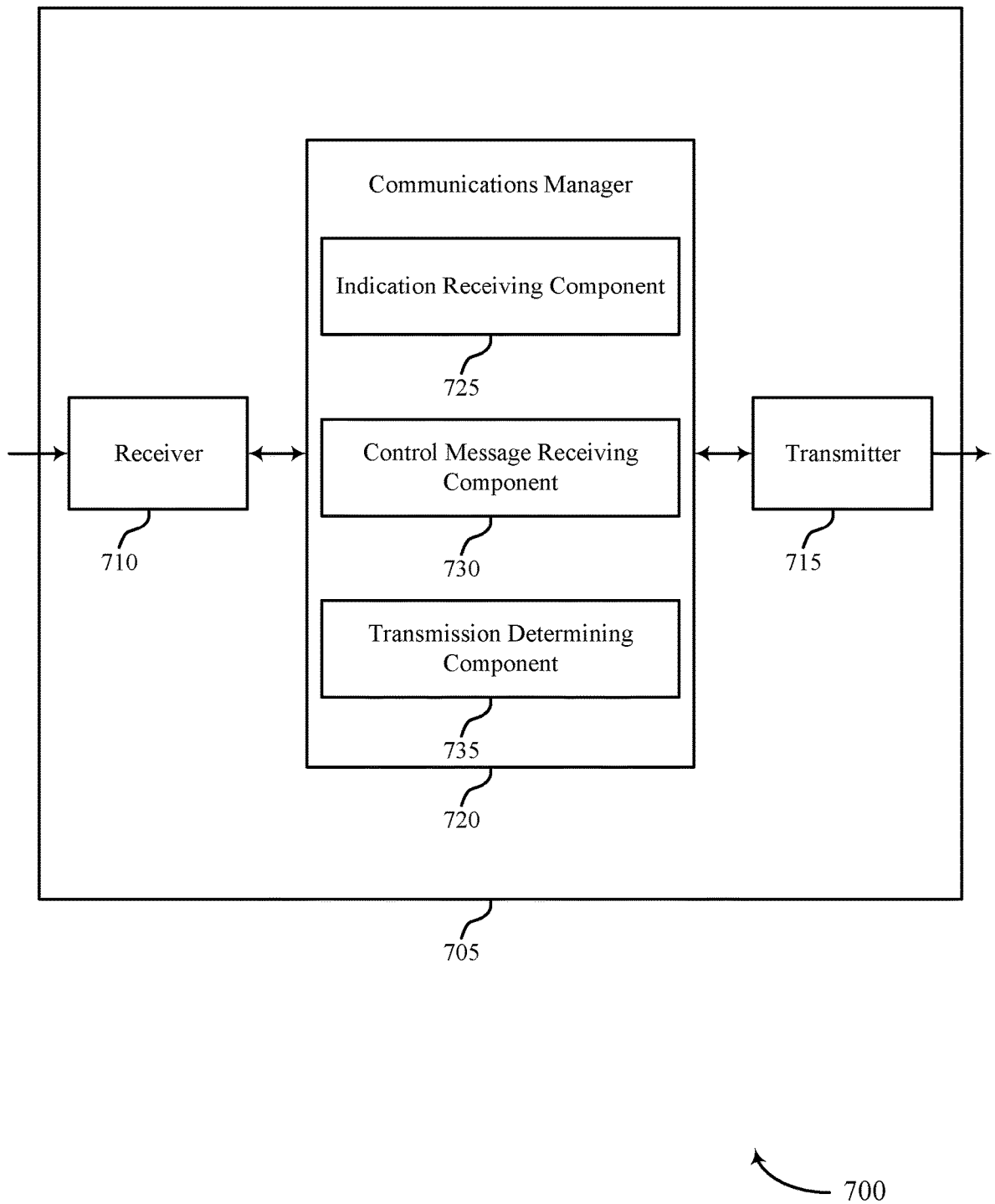

FIG. 7 shows a block diagram 700 of a device 705 that supports downlink pre-emption and uplink cancellation for full-duplex systems in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to downlink pre-emption and uplink cancellation for full-duplex systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to downlink pre-emption and uplink cancellation for full-duplex systems). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of downlink pre-emption and uplink cancellation for full-duplex systems as described herein. For example, the communications manager 720 may include an indication receiving component 725, a control message receiving component 730, a transmission determining component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at the device 705 in accordance with examples disclosed herein. The indication receiving component 725 may be configured as or otherwise support a means for receiving an indication of a SBFD configuration of a cell serving the device 705, the SBFD configuration indicating a first set of resources for downlink communications and a second set of resources for uplink communications, where the first set of resources and the second set of resources include non-overlapping frequency resources in a same time interval. The control message receiving component 730 may be configured as or otherwise support a means for receiving a control message that indicates a pre-emption of the first set of resources or a cancellation of the second set of resources. The transmission determining component 735 may be configured as or otherwise support a means for determining that downlink transmissions in at least a portion of the first set of resources are pre-empted or that uplink transmissions in at least a portion of the second set of resources are cancelled based on the control message and the SBFD configuration of the cell.

Figure 8:
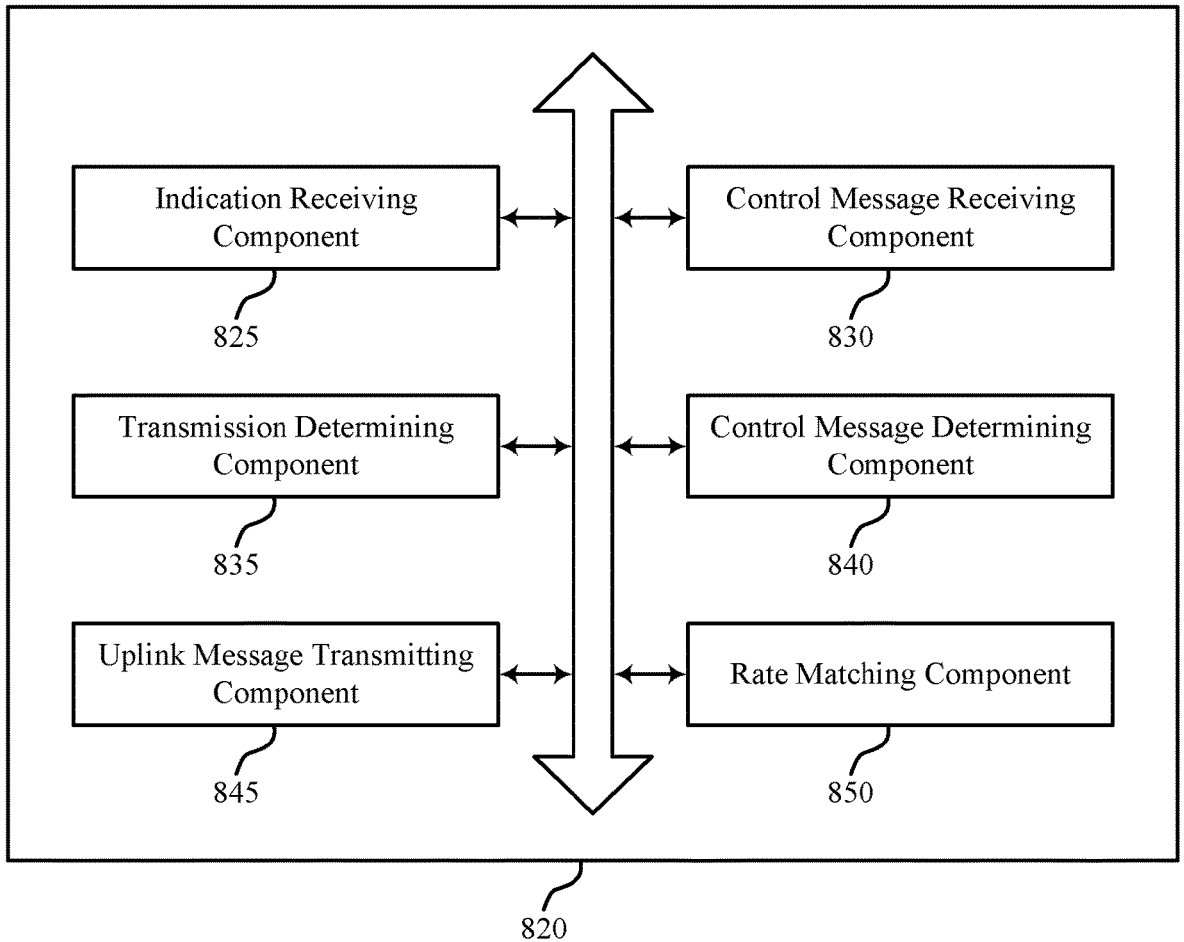
FIG. 8 shows a block diagram of a communications manager that supports downlink pre-emption and uplink cancellation for full-duplex systems in accordance with one or more aspects of the present disclosure.

FIG. 8 shows a block diagram 800 of a communications manager 820 that supports downlink pre-emption and uplink cancellation for full-duplex systems in accordance with one or more aspects of the present disclosure. The communications manager 820 may be an example of aspects of a communications manager 620, a communications manager 720, or both, as described herein. The communications manager 820, or various components thereof, may be an example of means for performing various aspects of downlink pre-emption and uplink cancellation for full-duplex systems as described herein. For example, the communications manager 820 may include an indication receiving component 825, a control message receiving component 830, a transmission determining component 835, a control message determining component 840, an uplink message transmitting component 845, a rate matching component 850, or any combination thereof. Each of these components may communicate, directly or indirectly, with one another (e.g., via one or more buses).

The communications manager 820 may support wireless communication at a UE in accordance with examples disclosed herein. The indication receiving component 825 may be configured as or otherwise support a means for receiving an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The control message receiving component 830 may be configured as or otherwise support a means for receiving a control message that indicates a pre-emption of the first set of resources or a cancellation of the second set of resources. The transmission determining component 835 may be configured as or otherwise support a means for determining that downlink transmissions in at least a portion of the first set of resources are pre-empted or that uplink transmissions in at least a portion of the second set of resources are cancelled based on the control message and the SBFD configuration of the cell.

In some examples, to support determining, the control message determining component 840 may be configured as or otherwise support a means for determining that the control message is applicable to PUCCH transmissions and PRACH transmissions based on the SBFD configuration of the cell and a format of the control message, where the SBFD configuration indicates that SBFD communications are enabled for the cell.

In some examples, to support determining, the control message determining component 840 may be configured as or otherwise support a means for determining that the control message is applicable to all uplink transmissions and uplink priority levels based on the SBFD configuration of the cell and a format of the control message, where the SBFD configuration indicates that SBFD communications are enabled for the cell.

In some examples, the uplink message transmitting component 845 may be configured as or otherwise support a means for transmitting an uplink message via the second set of resources based on an uplink cancellation priority parameter indicated by the SBFD configuration of the cell and a priority level of the uplink message, where a transmission power for the uplink message is based on the priority level of the uplink message.

In some examples, to support determining, the control message determining component 840 may be configured as or otherwise support a means for determining that the control message is applicable to PUSCH transmissions and SRS transmissions based on the SBFD configuration of the cell and a format of the control message, where the SBFD configuration indicates that SBFD communications are disabled for the cell.

In some examples, the transmission determining component 835 may be configured as or otherwise support a means for determining to suppress an uplink transmission based on an overlap between the second set of resources and frequency resources to be used for the uplink transmission.

In some examples, the transmission determining component 835 may be configured as or otherwise support a means for determining to puncture a first portion of an uplink transmission based on an overlap between the second set of resources and frequency resources to be used for the first portion of the uplink transmission.

In some examples, the rate matching component 850 may be configured as or otherwise support a means for applying a rate matching scheme to a first portion of an uplink transmission based on an overlap between the second set of resources and frequency resources to be used for the first portion of the uplink transmission.

In some examples, the transmission determining component 835 may be configured as or otherwise support a means for determining that frequency resources to be used for a first portion of an uplink transmission overlap with the second set of resources. In some examples, the uplink message transmitting component 845 may be configured as or otherwise support a means for transmitting the first portion of the uplink transmission with a first PSD. In some examples, the uplink message transmitting component 845 may be configured as or otherwise support a means for transmitting a remaining portion of the uplink transmission with a second PSD that is lower than the first PSD.

In some examples, to support determining, the control message determining component 840 may be configured as or otherwise support a means for determining that the control message is applicable to all downlink transmissions and downlink priority levels based on the SBFD configuration of the cell and a format of the control message, where the SBFD configuration indicates that SBFD communications are enabled for the cell.

In some examples, to support determining, the transmission determining component 835 may be configured as or otherwise support a means for determining that one or more SSB transmissions or PBCH transmissions are cancelled based on the SBFD configuration of the cell and a format of the control message, where the SBFD configuration indicates that SBFD communications are enabled for the cell.

In some examples, to support determining, the control message determining component 840 may be configured as or otherwise support a means for determining that the control message is applicable to SSB transmissions and PBCH transmissions based on a format of the control message and a SBFD configuration of a second cell that is different from the cell serving the UE, where the SBFD configuration of the second cell indicates that SBFD communications are enabled for the second cell.

In some examples, to support receiving the control message, the control message receiving component 830 may be configured as or otherwise support a means for receiving UE-specific signaling or group common signaling that indicates a muting pattern for one or both of the first set of resources or the second set of resources. In some examples, the UE-specific signaling or the group common signaling includes DCI or a MAC-CE.

In some examples, to support determining, the transmission determining component 835 may be configured as or otherwise support a means for determining that downlink transmissions are not expected in one or more symbols of the first set of resources based on a downlink RRC configuration of the one or more symbols.

In some examples, to support determining, the transmission determining component 835 may be configured as or otherwise support a means for determining that uplink transmissions in one or more symbols of the second set of resources are cancelled based on an uplink RRC configuration of the one or more symbols.

In some examples, to support determining, the transmission determining component 835 may be configured as or otherwise support a means for determining that downlink transmissions are not expected in a downlink sub-band or uplink sub-band based on a sub-band blanking indication in the control message.

Figure 9:
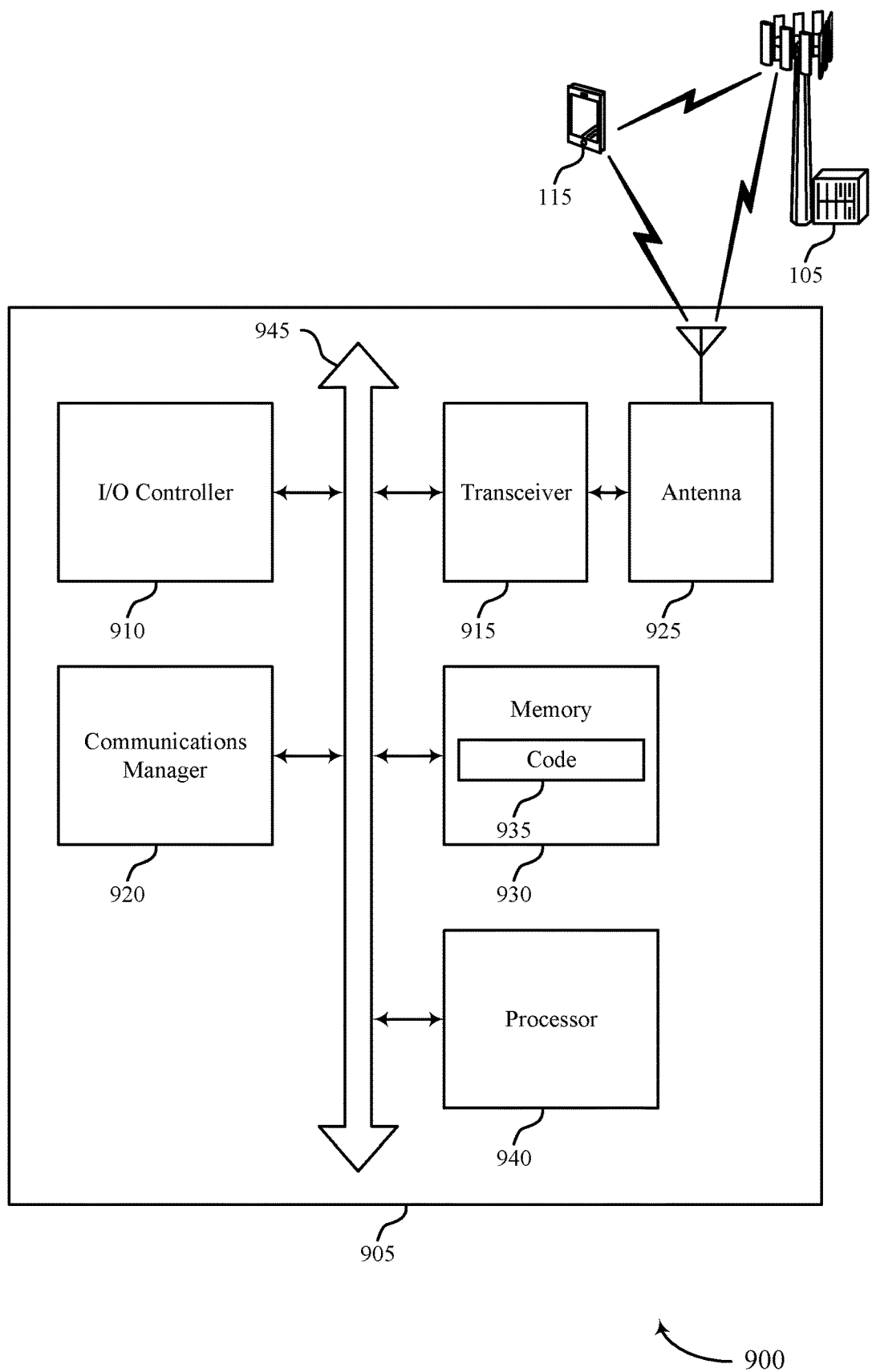
FIG. 9 shows a diagram of a system including a device that supports downlink pre-emption and uplink cancellation for full-duplex systems in accordance with one or more aspects of the present disclosure.

FIG. 9 shows a diagram of a system 900 including a device 905 that supports downlink pre-emption and uplink cancellation for full-duplex systems in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting downlink pre-emption and uplink cancellation for full-duplex systems). For example, the device 905 or a component of the device 905 may include a processor 940 and memory 930 coupled with or to the processor 940, the processor 940 and memory 930 configured to perform various functions described herein.

The communications manager 920 may support wireless communication at the device 905 in accordance with examples disclosed herein. For example, the communications manager 920 may be configured as or otherwise support a means for receiving an indication of a SBFD configuration of a cell serving the device 905, the SBFD configuration indicating a first set of resources for downlink communications and a second set of resources for uplink communications, where the first set of resources and the second set of resources include non-overlapping frequency resources in a same time interval. The communications manager 920 may be configured as or otherwise support a means for receiving a control message that indicates a pre-emption of the first set of resources or a cancellation of the second set of resources. The communications manager 920 may be configured as or otherwise support a means for determining that downlink transmissions in at least a portion of the first set of resources are pre-empted or that uplink transmissions in at least a portion of the second set of resources are cancelled based on the control message and the SBFD configuration of the cell.

By including or configuring the communications manager 920 in accordance with examples as described herein, the device 905 may support techniques for reducing inter-gNB CLI in full-duplex wireless communications systems. For example, a network entity with SBFD enabled can use one or more pre-emption indications (transmitted by means of DCI format 2_t), cancellation indications (transmitted by means of DCI format 2_4), or muting patterns (indicated by L1 or L2 signaling) to mute one or more PUCCH, PUSCH, PRACH, or SRS transmissions from the device 905, thereby reducing the probability of such transmissions causing CLI at other communication devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of downlink pre-emption and uplink cancellation for full-duplex systems as described herein, or the processor 940 and the memory 930 may be otherwise configured to perform or support such operations.

Figure 10:
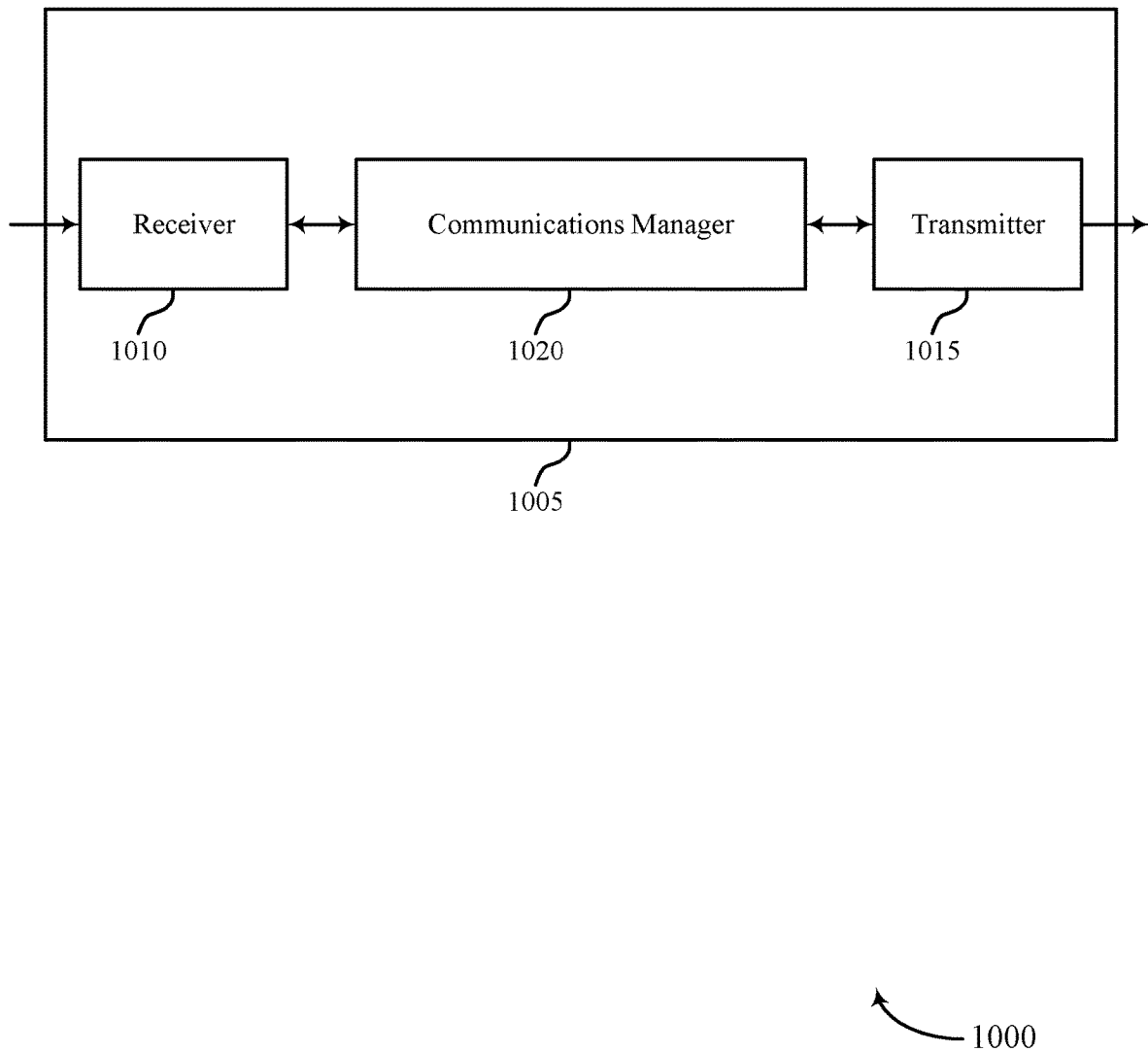
FIGS. 10 and 11 show block diagrams of devices that support downlink pre-emption and uplink cancellation for full-duplex systems in accordance with one or more aspects of the present disclosure.

FIG. 10 shows a block diagram 1000 of a device 1005 that supports downlink pre-emption and uplink cancellation for full-duplex systems in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of downlink pre-emption and uplink cancellation for full-duplex systems as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at the device 1005 in accordance with examples disclosed herein. For example, the communications manager 1020 may be configured as or otherwise support a means for transmitting an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The communications manager 1020 may be configured as or otherwise support a means for transmitting a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption and improved communication reliability. For example, the described techniques may reduce CLI at the device 1005, which may increase the likelihood of the device 1005 successfully receiving uplink transmissions from other communication devices. As a result, the device 1005 may request fewer retransmissions, which may enable the device to remain in sleep mode (e.g., a low power state) for a longer duration.

Figure 11:
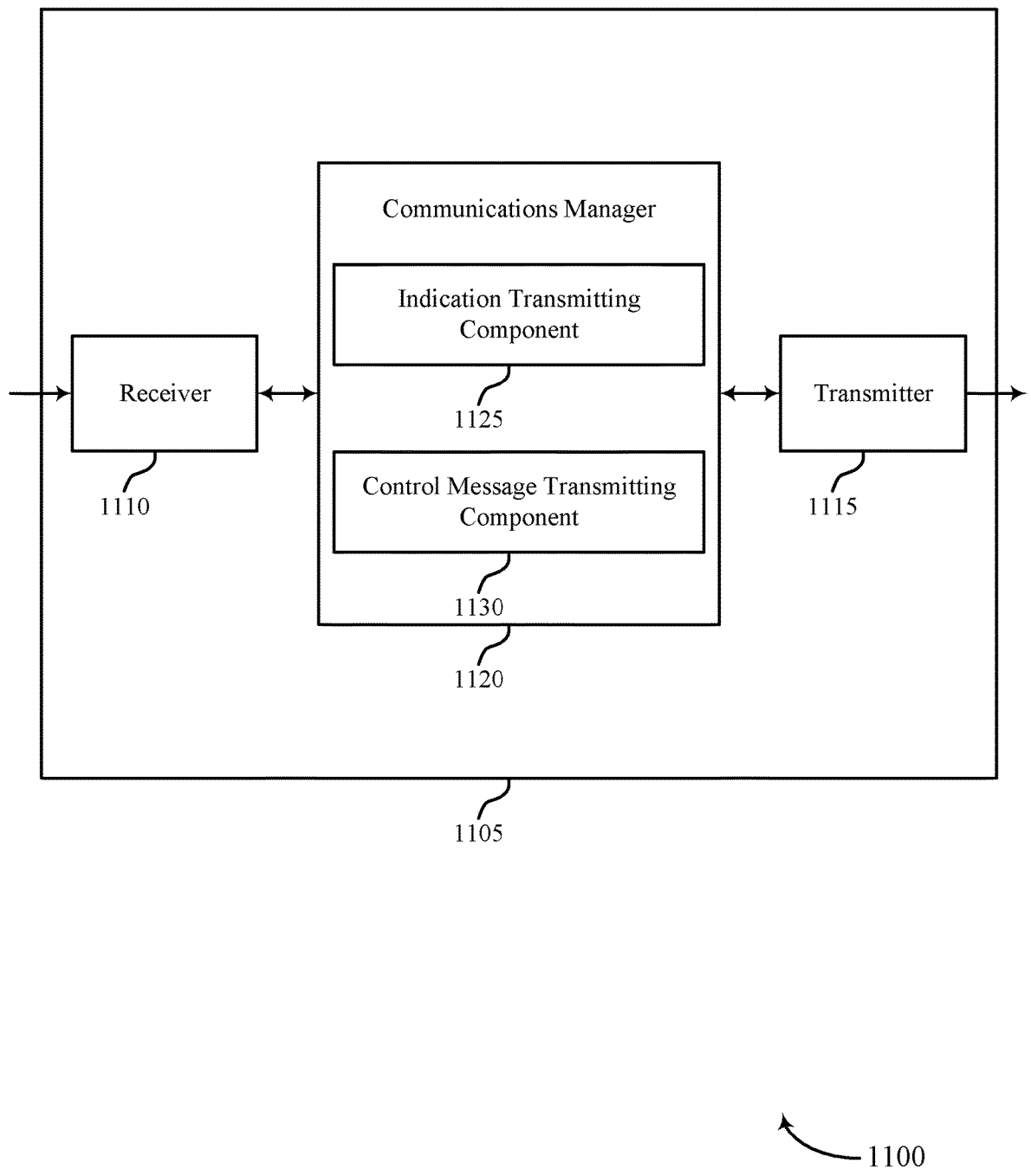

FIG. 11 shows a block diagram 1100 of a device 1105 that supports downlink pre-emption and uplink cancellation for full-duplex systems in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of downlink pre-emption and uplink cancellation for full-duplex systems as described herein. For example, the communications manager 1120 may include an indication transmitting component 1125 a control message transmitting component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at the device 1105 in accordance with examples disclosed herein. The indication transmitting component 1125 may be configured as or otherwise support a means for transmitting an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The control message transmitting component 1130 may be configured as or otherwise support a means for transmitting a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

Figure 12:
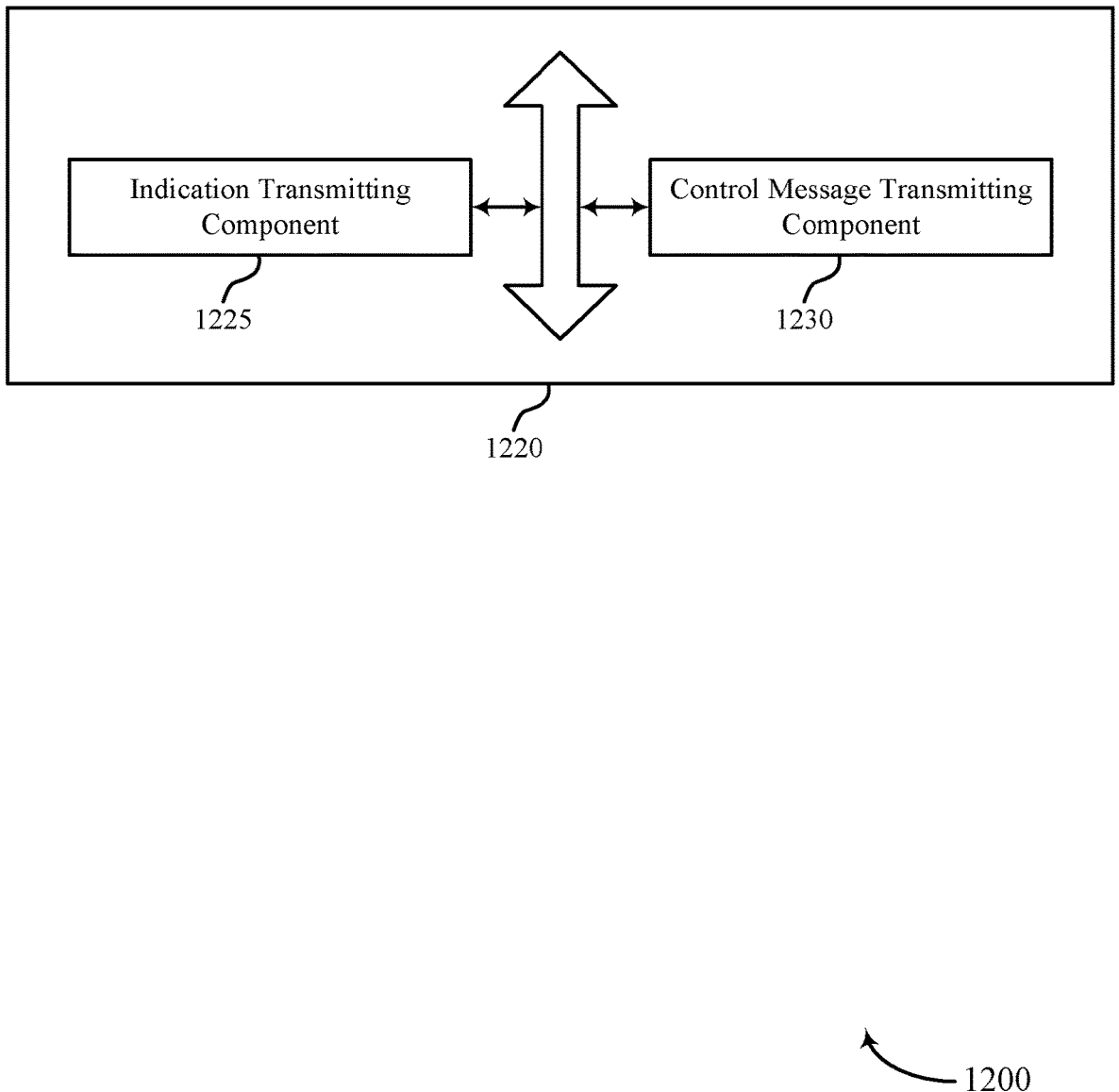
FIG. 12 shows a block diagram of a communications manager that supports downlink pre-emption and uplink cancellation for full-duplex systems in accordance with one or more aspects of the present disclosure.

FIG. 12 shows a block diagram 1200 of a communications manager 1220 that supports downlink pre-emption and uplink cancellation for full-duplex systems in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of downlink pre-emption and uplink cancellation for full-duplex systems as described herein. For example, the communications manager 1220 may include an indication transmitting component 1225 a control message transmitting component 1230, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples disclosed herein. The indication transmitting component 1225 may be configured as or otherwise support a means for transmitting an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The control message transmitting component 1230 may be configured as or otherwise support a means for transmitting a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

In some examples, to support transmitting the control message, the control message transmitting component 1230 may be configured as or otherwise support a means for transmitting UE-specific signaling or group common signaling that indicates a muting pattern for one or both of the first set of resources or the second set of resources.

In some examples, the muting pattern indicated by the UE-specific signaling or the group common signaling is applicable to the cell serving the UE. In some examples, the muting pattern is applicable to one or both of the first set of resources or the second set of resources when SBFD communications are enabled for the cell. In some examples, the UE-specific signaling or the group common signaling includes DCI or a MAC-CE.

Figure 13:
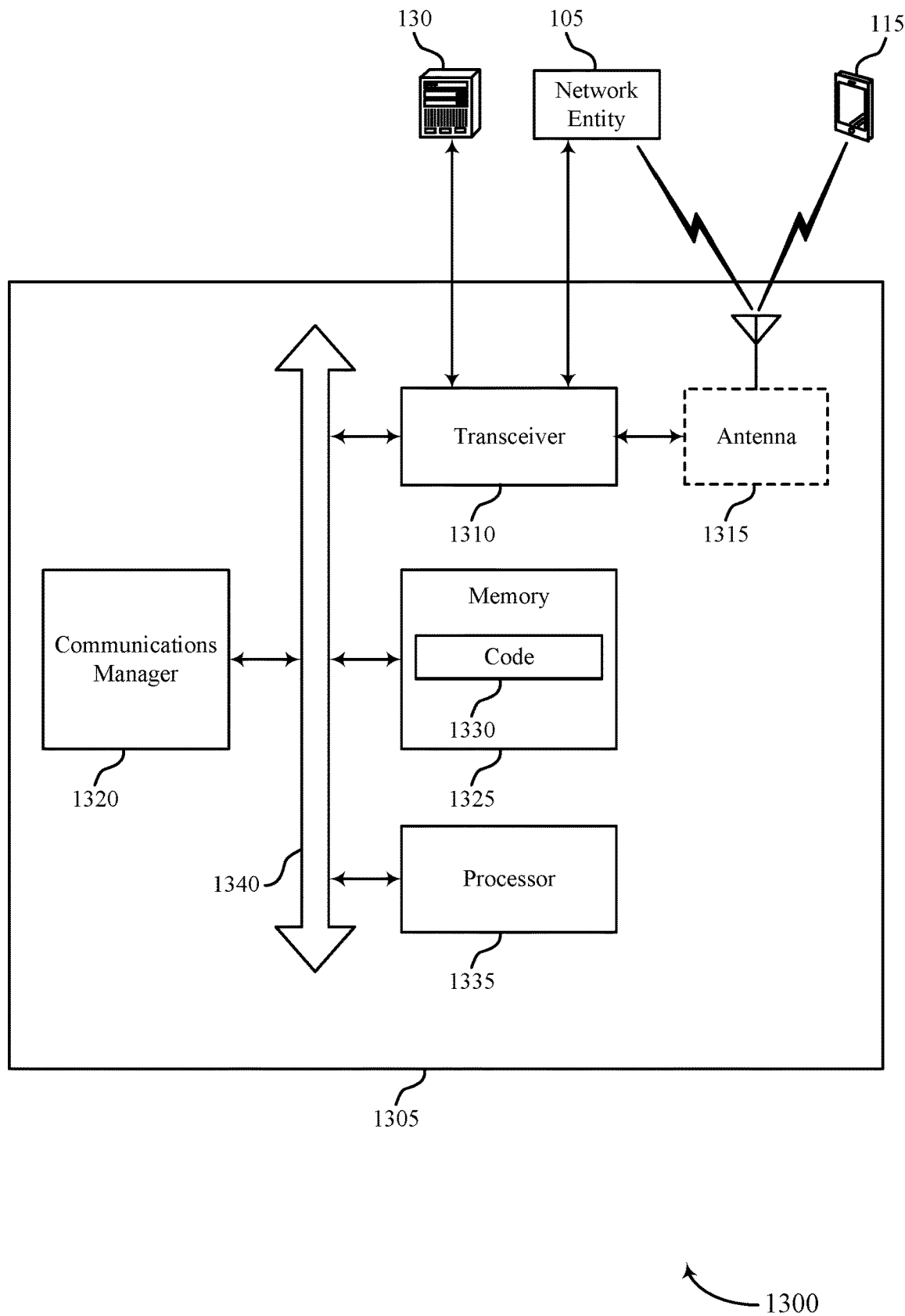
FIG. 13 shows a diagram of a system including a device that supports downlink pre-emption and uplink cancellation for full-duplex systems in accordance with one or more aspects of the present disclosure.

FIG. 13 shows a diagram of a system 1300 including a device 1305 that supports downlink pre-emption and uplink cancellation for full-duplex systems in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting downlink pre-emption and uplink cancellation for full-duplex systems). For example, the device 1305 or a component of the device 1305 may include a processor 1335 and memory 1325 coupled with the processor 1335, the processor 1335 and memory 1325 configured to perform various functions described herein.

The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305.

The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at the device 1305 in accordance with examples disclosed herein. For example, the communications manager 1320 may be configured as or otherwise support a means for transmitting an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The communications manager 1320 may be configured as or otherwise support a means for transmitting a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell.

By including or configuring the communications manager 1320 in accordance with examples as described herein, the device 1305 may support techniques for reducing inter-gNB CLI caused by the device 1305. For example, the device 1305 (a network entity with SBFD enabled) can use one or more pre-emption indications (transmitted by means of DCI format 2_I) or muting patterns (indicated by UE-specific signaling or group-common signaling) to pre-empt one or more SSB or PBCH transmissions from the device 1305 that could potentially cause inter-gNB CLI at a second network entity, thereby increasing the likelihood of successful uplink reception at the second network entity.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of downlink pre-emption and uplink cancellation for full-duplex systems as described herein, or the processor 1335 and the memory 1325 may be otherwise configured to perform or support such operations.

Figure 14:
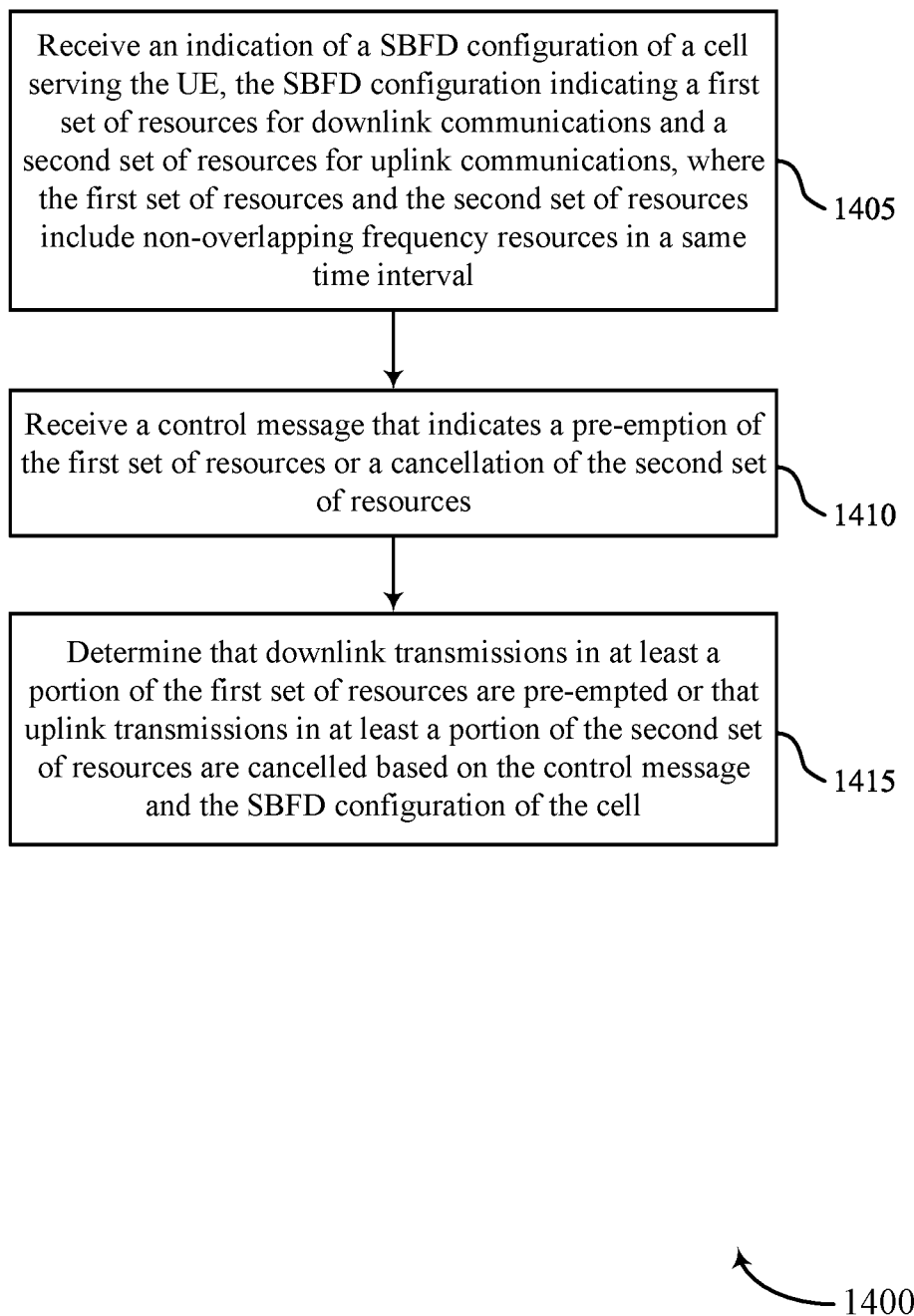
FIGS. 14 through 17 show flowcharts illustrating methods that support downlink pre-emption and uplink cancellation for full-duplex systems in accordance with one or more aspects of the present disclosure.

FIG. 14 shows a flowchart illustrating a method 1400 that supports downlink pre-emption and uplink cancellation for full-duplex systems in accordance with one or more aspects of the present disclosure. Aspects of the method 1400 may be implemented by a UE or components thereof. For example, operations of the method 1400 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the UE may receive an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The operations of 1405 may be performed in accordance with examples disclosed herein. In some examples, aspects of the operations of 1405 may be performed by an indication receiving component 825, as described with reference to FIG. 8.

At 1410, the UE may receive a control message that indicates a pre-emption of the first set of resources or a cancellation of the second set of resources. The operations of 1410 may be performed in accordance with examples disclosed herein. In some examples, aspects of the operations of 1410 may be performed by a control message receiving component 830, as described with reference to FIG. 8.

At 1415, the UE may determine that downlink transmissions in at least a portion of the first set of resources are pre-empted or that uplink transmissions in at least a portion of the second set of resources are cancelled based on the control message and the SBFD configuration of the cell. The operations of 1415 may be performed in accordance with examples disclosed herein. In some examples, aspects of the operations of 1415 may be performed by a transmission determining component 835, as described with reference to FIG. 8.

Figure 15:
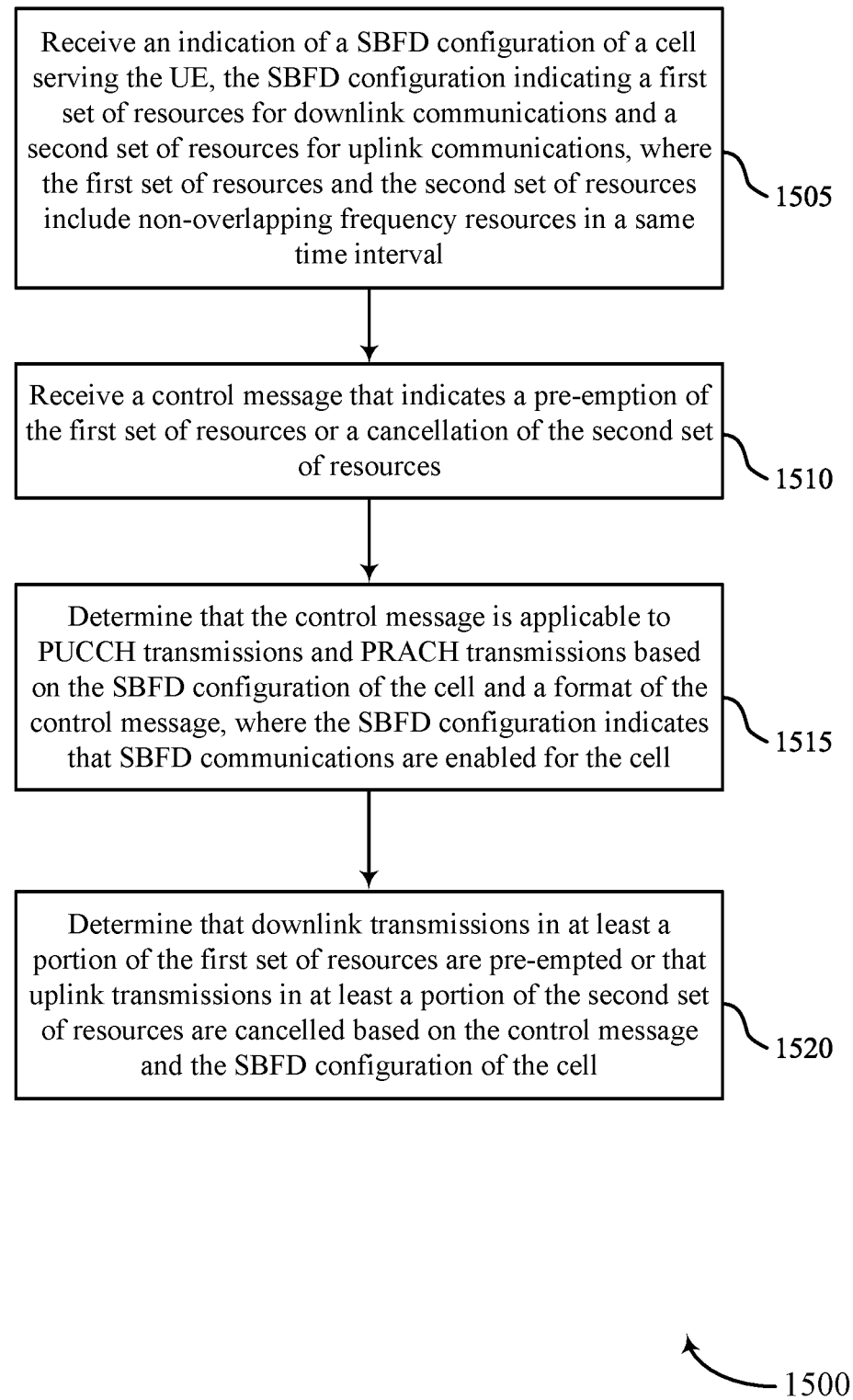

FIG. 15 shows a flowchart illustrating a method 1500 that supports downlink pre-emption and uplink cancellation for full-duplex systems in accordance with one or more aspects of the present disclosure. The operations of the method 1500 may be implemented by a UE or components thereof. For example, the operations of the method 1500 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the UE may receive an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The operations of 1505 may be performed in accordance with examples disclosed herein. In some examples, aspects of the operations of 1505 may be performed by an indication receiving component 825, as described with reference to FIG. 8.

At 1510, the UE may receive a control message that indicates a pre-emption of the first set of resources or a cancellation of the second set of resources. The operations of 1510 may be performed in accordance with examples disclosed herein. In some examples, aspects of the operations of 1510 may be performed by a control message receiving component 830, as described with reference to FIG. 8.

At 1515, the UE may determine that the control message is applicable to PUCCH transmissions and PRACH transmissions based on the SBFD configuration of the cell and a format of the control message, where the SBFD configuration indicates that SBFD communications are enabled for the cell. The operations of 1515 may be performed in accordance with examples disclosed herein. In some examples, aspects of the operations of 1515 may be performed by a control message determining component 840, as described with reference to FIG. 8.

At 1520, the UE may determine that downlink transmissions in at least a portion of the first set of resources are pre-empted or that uplink transmissions in at least a portion of the second set of resources are cancelled based on the control message and the SBFD configuration of the cell. The operations of 1520 may be performed in accordance with examples disclosed herein. In some examples, aspects of the operations of 1520 may be performed by a transmission determining component 835, as described with reference to FIG. 8.

Figure 16:
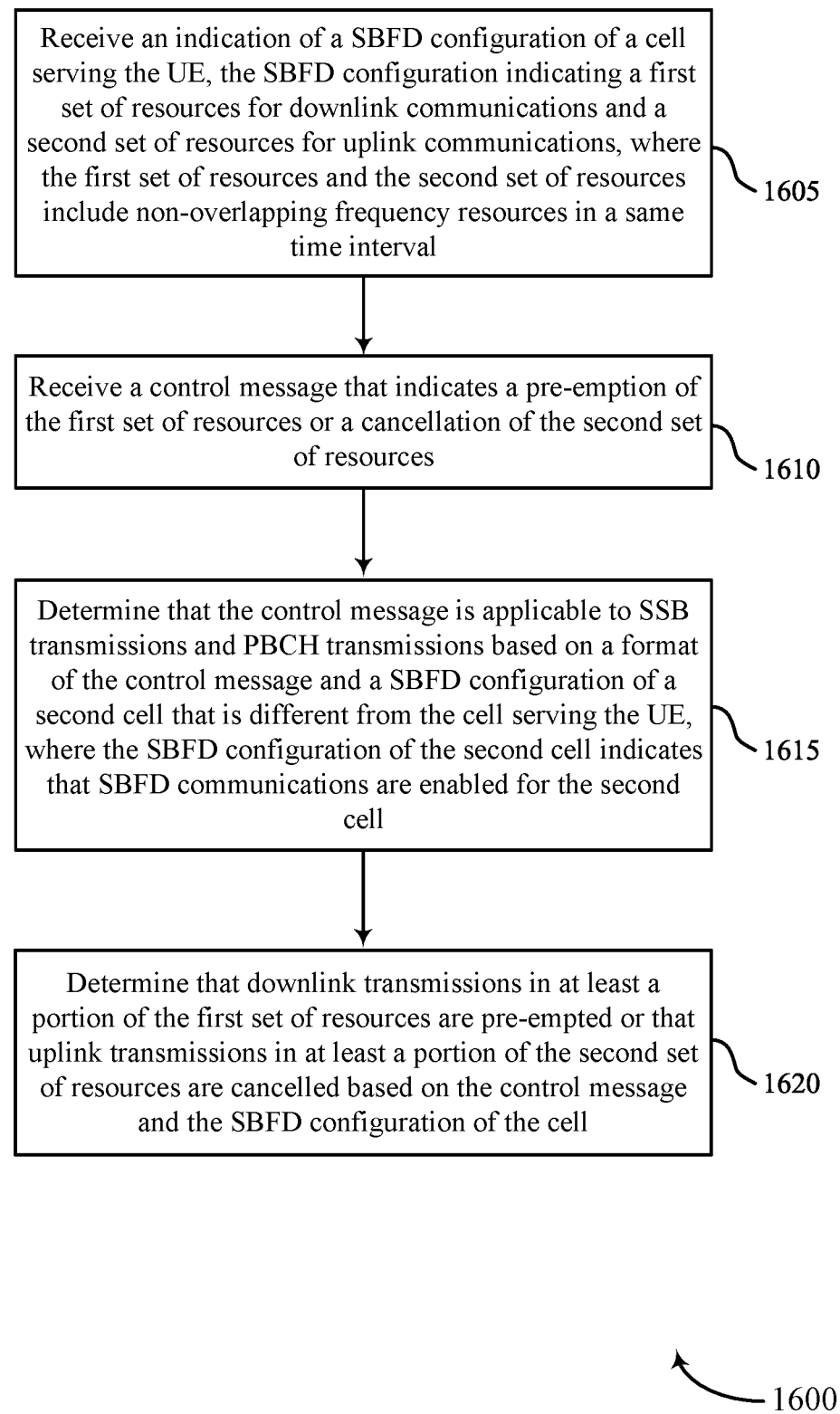

FIG. 16 shows a flowchart illustrating a method 1600 that supports downlink pre-emption and uplink cancellation for full-duplex systems in accordance with one or more aspects of the present disclosure. The operations of the method 1600 may be implemented by a UE or components thereof. For example, the operations of the method 1600 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the UE may receive an indication of a SBFD configuration of a cell serving the UE, the SBFD configuration indicating a first set of resources for downlink communications and a second set of resources for uplink communications, where the first set of resources and the second set of resources include non-overlapping frequency resources in a same time interval. The operations of 1605 may be performed in accordance with examples disclosed herein. In some examples, aspects of the operations of 1605 may be performed by an indication receiving component 825, as described with reference to FIG. 8.

At 1610, the UE may receive a control message that indicates a pre-emption of the first set of resources or a cancellation of the second set of resources. The operations of 1610 may be performed in accordance with examples disclosed herein. In some examples, aspects of the operations of 1610 may be performed by a control message receiving component 830, as described with reference to FIG. 8.

At 1615, the UE may determine that the control message is applicable to SSB transmissions and PBCH transmissions based on a format of the control message and a SBFD configuration of a second cell that is different from the cell serving the UE, where the SBFD configuration of the second cell indicates that SBFD communications are enabled for the second cell. The operations of 1615 may be performed in accordance with examples disclosed herein. In some examples, aspects of the operations of 1615 may be performed by a control message determining component 840, as described with reference to FIG. 8.

At 1620, the UE may determine that downlink transmissions in at least a portion of the first set of resources are pre-empted or that uplink transmissions in at least a portion of the second set of resources are cancelled based on the control message and the SBFD configuration of the cell. The operations of 1620 may be performed in accordance with examples disclosed herein. In some examples, aspects of the operations of 1620 may be performed by a transmission determining component 835, as described with reference to FIG. 8.

Figure 17:
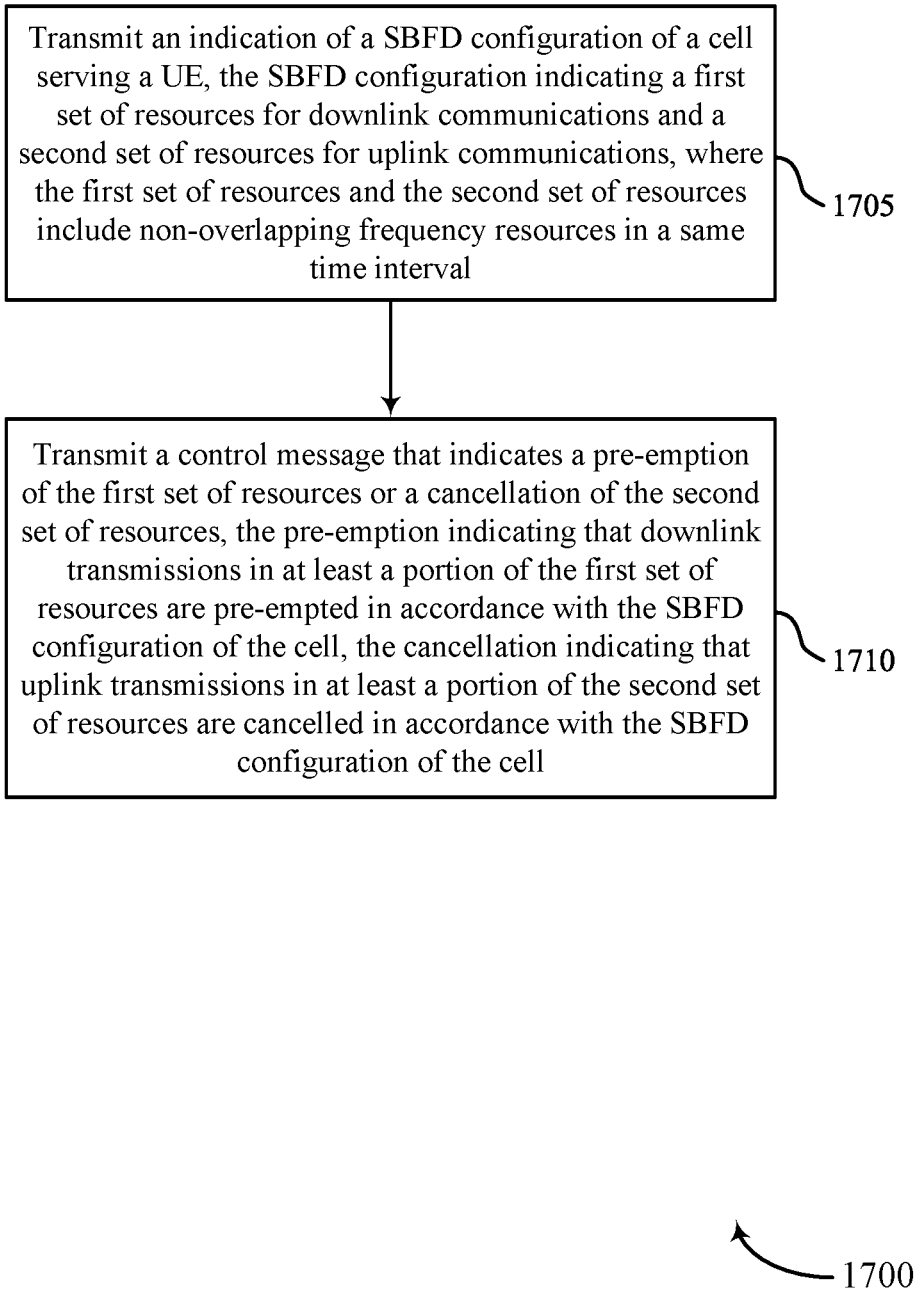

FIG. 17 shows a flowchart illustrating a method 1700 that supports downlink pre-emption and uplink cancellation for full-duplex systems in accordance with one or more aspects of the present disclosure. The operations of the method 1700 may be implemented by a network entity or components thereof. For example, the operations of the method 1700 may be performed by a network entity 105, as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the network entity may transmit an indication of a SBFD configuration of a cell serving a UE, the SBFD configuration indicating a first set of resources for downlink communications and a second set of resources for uplink communications, where the first set of resources and the second set of resources include non-overlapping frequency resources in a same time interval. The operations of 1705 may be performed in accordance with examples disclosed herein. In some examples, aspects of the operations of 1705 may be performed by an indication transmitting component 1225, as described with reference to FIG. 12.

At 1710, the network entity may transmit a control message that indicates a pre-emption of the first set of resources or a cancellation of the second set of resources, the pre-emption indicating that downlink transmissions in at least a portion of the first set of resources are pre-empted in accordance with the SBFD configuration of the cell, the cancellation indicating that uplink transmissions in at least a portion of the second set of resources are cancelled in accordance with the SBFD configuration of the cell. The operations of 1710 may be performed in accordance with examples disclosed herein. In some examples, aspects of the operations of 1710 may be performed by a control message transmitting component 1230, as described with reference to FIG. 12.

The following provides an overview of aspects of the present disclosure:

Aspect 1: A method for wireless communication at a user equipment (UE), comprising: receiving an indication of a sub-band full-duplex configuration of a cell serving the UE, the sub-band full-duplex configuration indicating a first set of resources for downlink communications and a second set of resources for uplink communications, wherein the first set of resources and the second set of resources comprise non-overlapping frequency resources in a same time interval; receiving a control message that indicates a pre-emption of the first set of resources or a cancellation of the second set of resources; and determining that downlink transmissions in at least a portion of the first set of resources are pre-empted or that uplink transmissions in at least a portion of the second set of resources are cancelled based at least in part on the control message and the sub-band full-duplex configuration of the cell.

Aspect 2: The method of aspect 1, wherein the determining comprises: determining that the control message is applicable to physical uplink control channel transmissions and physical random access channel transmissions based at least in part on the sub-band full-duplex configuration of the cell and a format of the control message, wherein the sub-band full-duplex configuration indicates that sub-band full-duplex communications are enabled for the cell.

Aspect 3: The method of any of aspects 1 through 2, wherein the determining comprises: determining that the control message is applicable to all uplink transmissions and uplink priority levels based at least in part on the sub-band full-duplex configuration of the cell and a format of the control message, wherein the sub-band full-duplex configuration indicates that sub-band full-duplex communications are enabled for the cell.

Aspect 4: The method of any of aspects 1 through 3, further comprising: transmitting an uplink message via the second set of resources based at least in part on an uplink cancellation priority parameter indicated by the sub-band full-duplex configuration of the cell and a priority level of the uplink message, wherein a transmission power for the uplink message is based at least in part on the priority level of the uplink message.

Aspect 5: The method of aspect 1, wherein the determining comprises: determining that the control message is applicable to physical uplink shared channel transmissions and sounding reference signal transmissions based at least in part on the sub-band full-duplex configuration of the cell and a format of the control message, wherein the sub-band full-duplex configuration indicates that sub-band full-duplex communications are disabled for the cell.

Aspect 6: The method of any of aspects 1 through 5, further comprising: determining to suppress an uplink transmission based at least in part on an overlap between the second set of resources and frequency resources to be used for the uplink transmission.

Aspect 7: The method of any of aspects 1 through 6, further comprising: determining to puncture a first portion of an uplink transmission based at least in part on an overlap between the second set of resources and frequency resources to be used for the first portion of the uplink transmission.

Aspect 8: The method of any of aspects 1 through 7, further comprising: applying a rate matching scheme to a first portion of an uplink transmission based at least in part on an overlap between the second set of resources and frequency resources to be used for the first portion of the uplink transmission.

Aspect 9: The method of any of aspects 1 through 8, further comprising: determining that frequency resources to be used for a first portion of an uplink transmission overlap with the second set of resources; transmitting the first portion of the uplink transmission with a first power spectral density; and transmitting a remaining portion of the uplink transmission with a second power spectral density that is lower than the first power spectral density.

Aspect 10: The method of any of aspects 1 through 4, wherein the determining comprises: determining that the control message is applicable to all downlink transmissions and downlink priority levels based at least in part on the sub-band full-duplex configuration of the cell and a format of the control message, wherein the sub-band full-duplex configuration indicates that sub-band full-duplex communications are enabled for the cell.

Aspect 11: The method of any of aspects 1 through 4, wherein the determining comprises: determining that one or more synchronization signal block transmissions or physical broadcast channel transmissions are cancelled based at least in part on the sub-band full-duplex configuration of the cell and a format of the control message, wherein the sub-band full-duplex configuration indicates that sub-band full-duplex communications are enabled for the cell.

Aspect 12: The method of any of aspects 1 through 4, wherein the determining comprises: determining that the control message is applicable to synchronization signal block transmissions and physical broadcast channel transmissions based at least in part on a format of the control message and a sub-band full-duplex configuration of a second cell that is different from the cell serving the UE, wherein the sub-band full-duplex configuration of the second cell indicates that sub-band full-duplex communications are enabled for the second cell.

Aspect 13: The method of any of aspects 1 through 12, wherein receiving the control message comprises: receiving UE-specific signaling or group common signaling that indicates a muting pattern for one or both of the first set of resources or the second set of resources.

Aspect 14: The method of aspect 13, wherein the UE-specific signaling or the group common signaling comprises downlink control information or a medium access control-control element.

Aspect 15: The method of any of aspects 1 through 14, wherein the determining comprises: determining that downlink transmissions are not expected in one or more symbols of the first set of resources based at least in part on a downlink radio resource control configuration of the one or more symbols.

Aspect 16: The method of any of aspects 1 through 15, wherein the determining comprises: determining that uplink transmissions in one or more symbols of the second set of resources are cancelled based at least in part on an uplink radio resource control configuration of the one or more symbols.

Aspect 17: The method of any of aspects 1 through 16, wherein the determining comprises: determining that downlink transmissions are not expected in a downlink sub-band or uplink sub-band based at least in part on a sub-band blanking indication in the control message.

Aspect 18: A method for wireless communication at a network entity, comprising: transmitting an indication of a sub-band full-duplex configuration of a cell serving a user equipment (UE), the sub-band full-duplex configuration indicating a first set of resources for downlink communications and a second set of resources for uplink communications, wherein the first set of resources and the second set of resources comprise non-overlapping frequency resources in a same time interval; and transmitting a control message that indicates a pre-emption of the first set of resources or a cancellation of the second set of resources, the pre-emption indicating that downlink transmissions in at least a portion of the first set of resources are pre-empted in accordance with the sub-band full-duplex configuration of the cell, the cancellation indicating that uplink transmissions in at least a portion of the second set of resources are cancelled in accordance with the sub-band full-duplex configuration of the cell.

Aspect 19: The method of aspect 18, wherein transmitting the control message comprises: transmitting UE-specific signaling or group common signaling that indicates a muting pattern for one or both of the first set of resources or the second set of resources.

Aspect 20: The method of aspect 19, wherein the muting pattern indicated by the UE-specific signaling or the group common signaling is applicable to the cell serving the UE.

Aspect 21: The method of any of aspects 19 through 20, wherein the muting pattern is applicable to one or both of the first set of resources or the second set of resources when sub-band full-duplex communications are enabled for the cell.

Aspect 22: The method of any of aspects 19 through 21, wherein the UE-specific signaling or the group common signaling comprises downlink control information or a medium access control-control element.

Aspect 23: An apparatus for wireless communication at a UE, comprising a processor, memory coupled with the processor, and instructions stored in the memory and executable by the processor to cause the apparatus to perform a method of any of aspects 1 through 17.

Aspect 24: An apparatus for wireless communication at a UE, comprising at least one means for performing a method of any of aspects 1 through 17.

Aspect 25: A non-transitory computer-readable medium storing code for wireless communication at a UE, the code comprising instructions executable by a processor to perform a method of any of aspects 1 through 17.

Aspect 26: An apparatus for wireless communication at a network entity, comprising a processor, memory coupled with the processor, and instructions stored in the memory and executable by the processor to cause the apparatus to perform a method of any of aspects 18 through 22.

Aspect 27: An apparatus for wireless communication at a network entity, comprising at least one means for performing a method of any of aspects 18 through 22.

Aspect 28: A non-transitory computer-readable medium storing code for wireless communication at a network entity, the code comprising instructions executable by a processor to perform a method of any of aspects 18 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving an indication of a sub-band full-duplex configuration of a cell serving the UE, the sub-band full-duplex configuration indicating a first set of resources for downlink communications and a second set of resources for uplink communications, wherein the first set of resources and the second set of resources comprise non-overlapping frequency resources in a same time interval;

receiving a control message that indicates a cancellation of the second set of resources, wherein the cancellation is applicable to physical uplink control channel transmissions and physical random access channel transmissions based at least in part on the sub-band full-duplex configuration of the cell and a format of the control message; and determining that physical uplink control channel transmissions and physical random access channel transmissions in at least a portion of the second set of resources are cancelled based at least in part on the control message and the sub-band full-duplex configuration of the cell.

2. The method of claim 1, wherein the determining comprises:

determining that the control message is applicable to physical uplink control channel transmissions and physical random access channel transmissions based at least in part on the sub-band full-duplex configuration of the cell and the format of the control message, wherein the sub-band full-duplex configuration indicates that sub-band full-duplex communications are enabled for the cell.

3. The method of claim 1, further comprising:

transmitting an uplink message via the second set of resources based at least in part on an uplink cancellation priority parameter indicated by the sub-band full-duplex configuration of the cell and a priority level of the uplink message, wherein a transmission power for the uplink message is based at least in part on the priority level of the uplink message.

4. The method of claim 1, further comprising:

determining to suppress an uplink transmission based at least in part on an overlap between the second set of resources and frequency resources to be used for the uplink transmission.

5. The method of claim 1, further comprising:

determining to puncture a first portion of an uplink transmission based at least in part on an overlap between the second set of resources and frequency resources to be used for the first portion of the uplink transmission.

6. The method of claim 1, further comprising:

applying a rate matching scheme to a first portion of an uplink transmission based at least in part on an overlap between the second set of resources and frequency resources to be used for the first portion of the uplink transmission.

7. The method of claim 1, further comprising:

determining that frequency resources to be used for a first portion of an uplink transmission overlap with the second set of resources;

transmitting the first portion of the uplink transmission with a first power spectral density; and transmitting a remaining portion of the uplink transmission with a second power spectral density that is lower than the first power spectral density.

8. The method of claim 1, wherein receiving the control message comprises:

receiving UE-specific signaling or group common signaling that indicates a muting pattern for the first set of resources or both the first set of resources and the second set of resources.

9. The method of claim 8, wherein the UE-specific signaling or the group common signaling comprises downlink control information or a medium access control-control element.

10. The method of claim 1, further comprising:

determining that downlink transmissions are not expected in one or more symbols of the first set of resources based at least in part on a downlink radio resource control configuration of the one or more symbols.

11. The method of claim 1, further comprising:

determining that uplink transmissions in one or more symbols of the second set of resources are cancelled based at least in part on an uplink radio resource control configuration of the one or more symbols.

12. A method for wireless communication at a network entity, comprising:

transmitting an indication of a sub-band full-duplex configuration of a cell serving a user equipment (UE), the sub-band full-duplex configuration indicating a first set of resources for downlink communications and a second set of resources for uplink communications, wherein the first set of resources and the second set of resources comprise non-overlapping frequency resources in a same time interval; and transmitting a control message that indicates a cancellation of the second set of resources, wherein the cancellation is applicable to physical uplink control channel transmissions and physical random access channel transmissions based at least in part on the sub-band full-duplex configuration of the cell and a format of the control message, the cancellation indicating that physical uplink control channel transmissions and physical random access channel transmissions in at least a portion of the second set of resources are cancelled in accordance with the sub-band full-duplex configuration of the cell.

13. The method of claim 12, wherein transmitting the control message comprises:

transmitting UE-specific signaling or group common signaling that indicates a muting pattern for the first set of resources or both the first set of resources and the second set of resources.

14. The method of claim 13, wherein the muting pattern indicated by the UE-specific signaling or the group common signaling is applicable to the cell serving the UE.

15. The method of claim 13, wherein the muting pattern is applicable to the first set of resources or both the first set of resources and the second set of resources when sub-band full-duplex communications are enabled for the cell.

16. The method of claim 13, wherein the UE-specific signaling or the group common signaling comprises downlink control information or a medium access control-control element.

17. An apparatus for wireless communication at a user equipment (UE), comprising:
  a processor;
  memory coupled with the processor; and
  instructions stored in the memory and executable by the processor to cause the apparatus to:
    receive an indication of a sub-band full-duplex configuration of a cell serving the UE, the sub-band full-duplex configuration indicating a first set of resources for downlink communications and a second set of resources for uplink communications, wherein the first set of resources and the second set of resources comprise non-overlapping frequency resources in a same time interval;
    receive a control message that indicates a cancellation of the second set of resources, wherein the cancellation is applicable to physical uplink control channel transmissions and physical random access channel transmissions based at least in part on the sub-band full-duplex configuration of the cell and a format of the control message; and
    determine that physical uplink control channel transmissions and physical random access channel transmissions in at least a portion of the second set of resources are cancelled based at least in part on the control message and the sub-band full-duplex configuration of the cell.

18. The apparatus of claim 17, wherein the instructions to determine are executable by the processor to cause the apparatus to:
  determine that the control message is applicable to physical uplink control channel transmissions and physical random access channel transmissions based at least in part on the sub-band full-duplex configuration of the cell and the format of the control message, wherein the sub-band full-duplex configuration indicates that sub-band full-duplex communications are enabled for the cell.

19. The apparatus of claim 17, wherein the instructions are further executable by the processor to cause the apparatus to:
  transmit an uplink message via the second set of resources based at least in part on an uplink cancellation priority parameter indicated by the sub-band full-duplex configuration of the cell and a priority level of the uplink message, wherein a transmission power for the uplink message is based at least in part on the priority level of the uplink message.

20. The apparatus of claim 17, wherein the instructions are further executable by the processor to cause the apparatus to:
  determine to suppress an uplink transmission based at least in part on an overlap between the second set of resources and frequency resources to be used for the uplink transmission.

21. The apparatus of claim 17, wherein the instructions are further executable by the processor to cause the apparatus to:
  determine to puncture a first portion of an uplink transmission based at least in part on an overlap between the second set of resources and frequency resources to be used for the first portion of the uplink transmission.

22. An apparatus for wireless communication at a network entity, comprising:
  a processor;
  memory coupled with the processor; and
  instructions stored in the memory and executable by the processor to cause the apparatus to:
    transmit an indication of a sub-band full-duplex configuration of a cell serving a user equipment (UE), the sub-band full-duplex configuration indicating a first set of resources for downlink communications and a second set of resources for uplink communications, wherein the first set of resources and the second set of resources comprise non-overlapping frequency resources in a same time interval; and
  transmit a control message that indicates a cancellation of the second set of resources, wherein the cancellation is applicable to physical uplink control channel transmissions and physical random access channel transmissions based at least in part on the sub-band full-duplex configuration of the cell and a format of the control message, indicating that downlink transmissions in at least a portion of the first set of the cancellation indicating that physical uplink control channel transmissions and physical random access channel transmissions in at least a portion of the second set of resources are cancelled in accordance with the sub-band full-duplex configuration of the cell.

* * * * *